United States Patent
Jinkins et al.

(10) Patent No.: US 10,353,068 B1
(45) Date of Patent: Jul. 16, 2019

(54) WEATHER RADAR ENABLED OFFSHORE OPERATION SYSTEM AND METHOD

(71) Applicant: Rockwell Collins, Inc., Cedar Rapids, IA (US)

(72) Inventors: Richard D. Jinkins, Rewey, WI (US); Richard M. Rademaker, Rijswijk (NL)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 221 days.

(21) Appl. No.: 15/222,923

(22) Filed: Jul. 28, 2016

(51) Int. Cl.
*G01S 13/93* (2006.01)
*G01S 13/95* (2006.01)
*G01S 7/04* (2006.01)
*G01S 13/94* (2006.01)

(52) U.S. Cl.
CPC ............. *G01S 13/953* (2013.01); *G01S 7/04* (2013.01); *G01S 13/9303* (2013.01); *G01S 13/94* (2013.01)

(58) Field of Classification Search
CPC ...... G01S 13/953; G01S 7/04; G01S 13/9303; G01S 13/94
USPC .......................................................... 342/26
See application file for complete search history.

(56) References Cited

U.S. PATENT DOCUMENTS

| | | |
|---|---|---|
| 2,416,155 A | 2/1947 | Chubb |
| 2,849,184 A | 8/1958 | Arden et al. |
| 2,929,059 A | 3/1960 | Parker |
| 2,930,035 A | 3/1960 | Altekruse |
| 2,948,892 A | 8/1960 | White |
| 2,965,894 A | 12/1960 | Sweeney |
| 2,994,966 A | 8/1961 | Senitsky et al. |
| 3,031,660 A | 4/1962 | Young |

(Continued)

FOREIGN PATENT DOCUMENTS

| | | |
|---|---|---|
| DE | 19649838 | 4/1998 |
| DE | 19949737 A1 | 4/2001 |

(Continued)

OTHER PUBLICATIONS

U.S. Appl. No. 15/222,923, filed Jul. 28, 2016, Rockwell Collins, Inc.

(Continued)

*Primary Examiner* — Timothy A Brainard
(74) *Attorney, Agent, or Firm* — Donna P. Suchy; Daniel M. Barbieri

(57) ABSTRACT

A weather radar system can be used as an airborne sensor for providing an image on an electronic display during low visibility offshore IFR operations (e.g. for a helicopter approach to an offshore platform, such as, a petroleum rig or other structure). The weather radar sensed image is representative of the external surroundings of the maritime environment associated with radar returns received by the weather radar system. Beam sharpening technology produces higher angular resolution of the sensed objects in the radar image which reduces the interpreted azimuth errors from the sensed radar image. Accordingly, beam sharpening technology advantageously allows object isolation of closely clustered offshore platforms and nearby objects. With operational credit provided to these capabilities, the minimal distance for obtaining visual reference with the target platform could be reduced, increasing the success rate of completing offshore operations in low visibility IFR conditions.

20 Claims, 7 Drawing Sheets

(56) References Cited

U.S. PATENT DOCUMENTS

| | | | |
|---|---|---|---|
| 3,049,702 A | 8/1962 | Schreitmueller |
| 3,064,252 A | 11/1962 | Varela |
| 3,070,795 A | 12/1962 | Chambers |
| 3,071,766 A | 1/1963 | Fenn |
| 3,072,903 A | 1/1963 | Meyer |
| 3,089,801 A | 5/1963 | Tierney et al. |
| 3,107,351 A | 10/1963 | Milam |
| 3,113,310 A | 12/1963 | Standing |
| 3,129,425 A | 4/1964 | Sanner |
| 3,153,234 A | 10/1964 | Begeman et al. |
| 3,175,215 A | 3/1965 | Blasberg et al. |
| 3,212,088 A | 10/1965 | Alexander et al. |
| 3,221,328 A | 11/1965 | Walter |
| 3,241,141 A | 3/1966 | Wall |
| 3,274,593 A | 9/1966 | Varela et al. |
| 3,325,807 A | 6/1967 | Burns et al. |
| 3,334,344 A | 8/1967 | Colby, Jr. |
| 3,339,199 A | 8/1967 | Pichafroy |
| 3,373,423 A | 3/1968 | Levy |
| 3,396,391 A * | 8/1968 | Anderson ............ G01S 13/94 342/65 |
| 3,397,397 A | 8/1968 | Barney |
| 3,448,450 A | 6/1969 | Alfandari et al. |
| 3,618,090 A | 11/1971 | Garrison |
| 3,680,094 A | 7/1972 | Bayle et al. |
| 3,716,855 A | 2/1973 | Asam |
| 3,739,380 A | 6/1973 | Burdic et al. |
| 3,781,878 A | 12/1973 | Kirkpatrick |
| 3,810,175 A | 5/1974 | Bell |
| 3,815,132 A | 6/1974 | Case et al. |
| 3,816,718 A | 6/1974 | Hall et al. |
| 3,851,758 A | 12/1974 | Makhijani et al. |
| 3,866,222 A | 2/1975 | Young |
| 3,885,237 A | 5/1975 | Kirkpatrick |
| 3,956,749 A | 5/1976 | Magorian |
| 4,024,537 A | 5/1977 | Hart |
| 4,058,701 A | 11/1977 | Gruber et al. |
| 4,058,710 A | 11/1977 | Altmann |
| 4,063,218 A | 12/1977 | Basov et al. |
| 4,103,300 A | 7/1978 | Gendreu et al. |
| 4,235,951 A | 11/1980 | Swarovski |
| 4,277,845 A | 7/1981 | Smith et al. |
| 4,405,986 A | 9/1983 | Gray |
| 4,435,707 A | 3/1984 | Clark |
| 4,481,519 A | 11/1984 | Margerum |
| 4,509,048 A | 4/1985 | Jain |
| 4,532,515 A | 7/1985 | Cantrell et al. |
| 4,594,676 A | 6/1986 | Breiholz et al. |
| 4,595,925 A | 6/1986 | Hansen |
| 4,598,292 A | 7/1986 | Devino |
| 4,628,318 A | 12/1986 | Alitz |
| 4,646,244 A | 2/1987 | Bateman et al. |
| 4,649,388 A | 3/1987 | Atlas |
| 4,654,665 A | 3/1987 | Kiuchi et al. |
| 4,685,149 A | 8/1987 | Smith et al. |
| 4,723,124 A | 2/1988 | Boles |
| 4,760,396 A | 7/1988 | Barney et al. |
| 4,828,382 A | 5/1989 | Vermilion |
| 4,843,398 A | 6/1989 | Houston et al. |
| 4,912,477 A | 3/1990 | Lory et al. |
| 4,914,436 A | 4/1990 | Bateman et al. |
| 4,924,401 A | 5/1990 | Bice et al. |
| 4,939,513 A | 7/1990 | Paterson et al. |
| 4,951,059 A | 8/1990 | Taylor, Jr. |
| 4,953,972 A | 9/1990 | Zuk |
| 4,965,573 A | 10/1990 | Gallagher et al. |
| 4,987,419 A | 1/1991 | Salkeld |
| 5,045,855 A | 9/1991 | Moreira |
| 5,047,779 A | 9/1991 | Hager |
| 5,047,781 A | 9/1991 | Bleakney |
| 5,049,886 A | 9/1991 | Seitz et al. |
| 5,053,778 A | 10/1991 | Imhoff |
| 5,166,688 A | 11/1992 | Moreira |
| 5,173,703 A | 12/1992 | Mangiapane et al. |
| 5,175,554 A | 12/1992 | Mangiapane et al. |
| 5,198,819 A | 3/1993 | Susnjara |
| 5,202,690 A | 4/1993 | Frederick |
| 5,247,303 A | 9/1993 | Cornelius et al. |
| 5,273,553 A | 12/1993 | Hoshi et al. |
| 5,311,183 A | 5/1994 | Mathews et al. |
| 5,329,391 A | 7/1994 | Miyamoto et al. |
| 5,332,998 A | 7/1994 | Avignon et al. |
| 5,345,241 A | 9/1994 | Huddle |
| 5,365,356 A | 11/1994 | McFadden |
| 5,383,457 A | 1/1995 | Cohen |
| 5,442,364 A | 8/1995 | Lee et al. |
| 5,530,440 A | 6/1996 | Danzer et al. |
| 5,539,409 A | 7/1996 | Mathews et al. |
| 5,559,515 A | 9/1996 | Alimena et al. |
| 5,559,518 A | 9/1996 | Didomizio |
| 5,566,840 A | 10/1996 | Waldner et al. |
| 5,592,178 A | 1/1997 | Chang et al. |
| 5,678,303 A | 10/1997 | Wichmann |
| 5,736,957 A | 4/1998 | Raney |
| 5,820,080 A | 10/1998 | Eschenbach |
| 5,828,332 A | 10/1998 | Frederick |
| 5,831,570 A | 11/1998 | Ammar et al. |
| 5,839,080 A | 11/1998 | Muller et al. |
| 5,867,119 A | 2/1999 | Corrubia et al. |
| 5,894,286 A | 4/1999 | Morand et al. |
| 5,918,517 A | 7/1999 | Malapert et al. |
| 5,920,276 A | 7/1999 | Frederick |
| 5,923,279 A | 7/1999 | Bamler et al. |
| 5,936,575 A | 8/1999 | Azzarelli et al. |
| 5,942,062 A | 8/1999 | Hassall et al. |
| 5,945,926 A | 8/1999 | Ammar et al. |
| 5,950,512 A | 9/1999 | Fields |
| 5,959,762 A | 9/1999 | Bandettini et al. |
| 5,978,715 A | 11/1999 | Briffe et al. |
| 6,002,347 A | 12/1999 | Daly et al. |
| 6,023,240 A | 2/2000 | Sutton |
| 6,061,016 A | 5/2000 | Lupinski et al. |
| 6,061,022 A | 5/2000 | Menegozzi et al. |
| 6,064,942 A | 5/2000 | Johnson et al. |
| 6,075,484 A | 6/2000 | Daniel et al. |
| 6,092,009 A | 7/2000 | Glover |
| 6,112,141 A | 8/2000 | Briffe et al. |
| 6,112,570 A | 9/2000 | Hruschak |
| 6,122,570 A | 9/2000 | Muller et al. |
| 6,127,944 A | 10/2000 | Daly et al. |
| 6,128,066 A | 10/2000 | Yokozeki |
| 6,128,553 A | 10/2000 | Gordon et al. |
| 6,138,060 A | 10/2000 | Conner et al. |
| 6,150,901 A | 11/2000 | Auken |
| 6,154,151 A | 11/2000 | McElreath et al. |
| 6,154,169 A | 11/2000 | Kuntman |
| 6,157,339 A | 12/2000 | Sato et al. |
| 6,157,891 A | 12/2000 | Lin |
| 6,163,021 A | 12/2000 | Mickelson |
| 6,166,661 A | 12/2000 | Anderson et al. |
| 6,169,770 B1 | 1/2001 | Henely |
| 6,178,391 B1 | 1/2001 | Anderson et al. |
| 6,184,816 B1 | 2/2001 | Zheng et al. |
| 6,188,330 B1 | 2/2001 | Glover |
| 6,194,980 B1 | 2/2001 | Thon |
| 6,199,008 B1 | 3/2001 | Aratow et al. |
| 6,201,494 B1 * | 3/2001 | Kronfeld ............ G01S 13/95 342/26 R |
| 6,204,806 B1 | 3/2001 | Hoech |
| 6,205,400 B1 | 3/2001 | Lin |
| 6,208,284 B1 | 3/2001 | Woodell et al. |
| 6,219,592 B1 | 4/2001 | Muller et al. |
| 6,233,522 B1 | 5/2001 | Morici |
| 6,236,351 B1 | 5/2001 | Conner et al. |
| 6,259,400 B1 | 7/2001 | Higgins et al. |
| 6,266,114 B1 | 7/2001 | Skarohlid |
| 6,278,799 B1 | 8/2001 | Hoffman |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,289,277 B1 | 9/2001 | Feyereisen et al. |
| 6,311,108 B1 | 10/2001 | Ammar et al. |
| 6,317,468 B1 | 11/2001 | Meyer |

(56) References Cited

U.S. PATENT DOCUMENTS

| | | |
|---|---|---|
| 6,317,690 B1 | 11/2001 | Gia |
| 6,317,872 B1 | 11/2001 | Gee et al. |
| 6,340,946 B1 | 1/2002 | Wolfson et al. |
| 6,345,127 B1 | 2/2002 | Mitchell |
| 6,359,585 B1 | 3/2002 | Bechman et al. |
| 6,366,013 B1 | 4/2002 | Leenders et al. |
| 6,373,418 B1 | 4/2002 | Abbey |
| 6,374,286 B1 | 4/2002 | Gee et al. |
| 6,377,202 B1 | 4/2002 | Kropfli et al. |
| 6,377,892 B1 | 4/2002 | Johnson et al. |
| 6,388,607 B1 | 5/2002 | Woodell |
| 6,388,608 B1 | 5/2002 | Woodell et al. |
| 6,388,724 B1 | 5/2002 | Campbell et al. |
| 6,389,354 B1 | 5/2002 | Hicks et al. |
| 6,401,038 B2 | 6/2002 | Gia |
| 6,411,890 B1 | 6/2002 | Zimmerman |
| 6,421,000 B1 | 7/2002 | McDowell |
| 6,421,603 B1 | 7/2002 | Pratt et al. |
| 6,424,288 B1 | 7/2002 | Woodell |
| 6,426,717 B1 | 7/2002 | Maloratsky |
| 6,426,720 B1 | 7/2002 | Ross et al. |
| 6,427,122 B1 | 7/2002 | Lin |
| 6,441,773 B1 | 8/2002 | Kelly et al. |
| 6,445,310 B1 | 9/2002 | Bateman et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,456,238 B1 | 9/2002 | Posey |
| 6,462,703 B2 | 10/2002 | Hedrick |
| 6,473,026 B1 | 10/2002 | Ali-Mehenni et al. |
| 6,473,037 B2 | 10/2002 | Vail et al. |
| 6,473,240 B1 | 10/2002 | Dehmlow |
| 6,481,482 B1 | 11/2002 | Shimotomai |
| 6,492,934 B1 | 12/2002 | Hwang et al. |
| 6,501,424 B1 | 12/2002 | Haendel et al. |
| 6,512,476 B1 | 1/2003 | Woodell |
| 6,512,527 B1 | 1/2003 | Barber et al. |
| 6,516,272 B2 | 2/2003 | Lin |
| 6,516,283 B2 | 2/2003 | McCall et al. |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | Dewulf |
| 6,591,171 B1 | 7/2003 | Ammar et al. |
| 6,593,875 B2 | 7/2003 | Bergin et al. |
| 6,600,443 B2 | 7/2003 | Landt |
| 6,603,425 B1 | 8/2003 | Woodell |
| 6,614,057 B2 | 9/2003 | Silvernail et al. |
| 6,650,275 B1 | 11/2003 | Kelly et al. |
| 6,650,291 B1 | 11/2003 | West et al. |
| 6,653,947 B2 | 11/2003 | Dwyer et al. |
| 6,667,710 B2 | 12/2003 | Cornell et al. |
| 6,681,668 B1 | 1/2004 | Smirle |
| 6,690,298 B1 | 2/2004 | Barber et al. |
| 6,690,299 B1 | 2/2004 | Suiter |
| 6,690,317 B2 | 2/2004 | Szeto et al. |
| 6,697,008 B1 | 2/2004 | Sternowski |
| 6,697,012 B2 | 2/2004 | Lodwig et al. |
| 6,710,663 B1 | 3/2004 | Berquist |
| 6,714,186 B1 | 3/2004 | Mosier et al. |
| 6,720,890 B1 | 4/2004 | Ezroni et al. |
| 6,724,344 B1 | 4/2004 | Stockmaster et al. |
| 6,731,236 B1 | 5/2004 | Hager et al. |
| 6,738,011 B1 | 5/2004 | Evans |
| 6,739,929 B2 | 5/2004 | Furukawa et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,760,155 B2 | 7/2004 | Murayama et al. |
| 6,771,626 B1 | 8/2004 | Golubiewski et al. |
| 6,782,392 B1 | 8/2004 | Weinberger et al. |
| 6,799,095 B1 | 9/2004 | Owen et al. |
| 6,803,245 B2 | 10/2004 | Auch et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,832,538 B1 | 12/2004 | Hwang |
| 6,839,017 B1 | 1/2005 | Dillman |
| 6,842,288 B1 | 1/2005 | Liu et al. |
| 6,850,185 B1 | 2/2005 | Woodell |
| 6,862,323 B1 | 3/2005 | Loper |
| 6,862,501 B2 | 3/2005 | He |
| 6,865,452 B2 | 3/2005 | Burdon |
| 6,879,280 B1 | 4/2005 | Bull et al. |
| 6,879,886 B2 | 4/2005 | Wilkins et al. |
| 6,882,302 B1 | 4/2005 | Woodell et al. |
| 6,908,202 B2 | 6/2005 | Graf et al. |
| 6,917,396 B2 | 7/2005 | Hiraishi et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,984,545 B2 | 1/2006 | Grigg et al. |
| 6,990,022 B2 | 1/2006 | Morikawa et al. |
| 6,992,614 B1 | 1/2006 | Joyce |
| 6,995,726 B1 | 2/2006 | West et al. |
| 6,998,648 B2 | 2/2006 | Silvernail |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,010,398 B2 | 3/2006 | Wilkins et al. |
| 7,023,375 B2 | 4/2006 | Klausing et al. |
| 7,026,956 B1 | 4/2006 | Wenger et al. |
| 7,028,304 B1 | 4/2006 | Weinberger et al. |
| 7,030,945 B2 | 4/2006 | Umemoto et al. |
| 7,034,753 B1 | 4/2006 | Elsallal et al. |
| 7,042,387 B2 | 5/2006 | Ridenour et al. |
| 7,053,796 B1 | 5/2006 | Barber |
| 7,057,549 B2 | 6/2006 | Block |
| 7,064,680 B2 | 6/2006 | Reynolds et al. |
| 7,069,120 B1 | 6/2006 | Koenck et al. |
| 7,089,092 B1 | 8/2006 | Wood et al. |
| 7,092,645 B1 | 8/2006 | Sternowski |
| 7,098,913 B1 | 8/2006 | Etherington et al. |
| 7,109,912 B1 | 9/2006 | Paramore et al. |
| 7,109,913 B1 | 9/2006 | Paramore et al. |
| 7,123,260 B2 | 10/2006 | Brust |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,180,476 B1 | 2/2007 | Guell et al. |
| 7,191,406 B1 | 3/2007 | Barber et al. |
| 7,196,329 B1 | 3/2007 | Wood et al. |
| 7,205,933 B1 | 4/2007 | Snodgrass |
| 7,209,070 B2 | 4/2007 | Gilliland et al. |
| 7,212,216 B2 | 5/2007 | He et al. |
| 7,218,268 B2 | 5/2007 | Vandenberg |
| 7,219,011 B1 | 5/2007 | Barber |
| 7,242,343 B1 | 7/2007 | Woodell |
| 7,242,345 B2 | 7/2007 | Raestad et al. |
| 7,250,903 B1 | 7/2007 | McDowell |
| 7,265,710 B2 | 9/2007 | Deagro |
| 7,269,657 B1 | 9/2007 | Alexander et al. |
| 7,272,472 B1 | 9/2007 | McElreath |
| 7,273,403 B2 | 9/2007 | Yokota et al. |

(56) References Cited

U.S. PATENT DOCUMENTS

| | | |
|---|---|---|
| 7,280,068 B2 | 10/2007 | Lee et al. |
| 7,289,058 B2 | 10/2007 | Shima |
| 7,292,178 B1 | 11/2007 | Woodell et al. |
| 7,292,180 B2 | 11/2007 | Schober |
| 7,295,150 B2 | 11/2007 | Burlet et al. |
| 7,295,901 B1 | 11/2007 | Little et al. |
| 7,301,496 B2 | 11/2007 | Honda et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,312,725 B2 | 12/2007 | Berson et al. |
| 7,312,743 B2 | 12/2007 | Ridenour et al. |
| 7,317,427 B2 | 1/2008 | Pauplis et al. |
| 7,321,332 B2 | 1/2008 | Focke et al. |
| 7,337,043 B2 | 2/2008 | Bull |
| 7,349,154 B2 | 3/2008 | Aiura et al. |
| 7,352,292 B2 | 4/2008 | Alter et al. |
| 7,361,240 B2 | 4/2008 | Kim |
| 7,372,394 B1 | 5/2008 | Woodell et al. |
| 7,373,223 B2 | 5/2008 | Murphy |
| 7,375,678 B2 | 5/2008 | Feyereisen et al. |
| 7,379,014 B1 | 5/2008 | Woodell et al. |
| 7,379,796 B2 | 5/2008 | Walsdorf et al. |
| 7,381,110 B1 | 6/2008 | Sampica et al. |
| 7,417,578 B1 | 8/2008 | Woodell et al. |
| 7,417,579 B1 | 8/2008 | Woodell |
| 7,423,578 B1 | 9/2008 | Tietjen |
| 7,446,697 B2 | 11/2008 | Burlet et al. |
| 7,446,938 B2 | 11/2008 | Miyatake et al. |
| 7,452,258 B1 | 11/2008 | Marzen et al. |
| 7,474,262 B2 | 1/2009 | Alland |
| 7,479,920 B2 | 1/2009 | Niv |
| 7,486,220 B1 | 2/2009 | Kronfeld et al. |
| 7,486,291 B2 | 2/2009 | Berson et al. |
| 7,492,304 B1 | 2/2009 | Woodell et al. |
| 7,492,305 B1 | 2/2009 | Woodell et al. |
| 7,515,069 B2 | 4/2009 | Dorneich et al. |
| 7,515,087 B1 | 4/2009 | Woodell et al. |
| 7,515,088 B1 | 4/2009 | Woodell et al. |
| 7,525,448 B1 | 4/2009 | Wilson et al. |
| 7,528,765 B1 | 5/2009 | Woodell et al. |
| 7,528,915 B2 | 5/2009 | Choi et al. |
| 7,541,970 B1 | 6/2009 | Godfrey et al. |
| 7,541,971 B1 | 6/2009 | Woodell et al. |
| 7,551,451 B2 | 6/2009 | Kim et al. |
| 7,557,735 B1 | 7/2009 | Woodell et al. |
| 7,566,254 B2 | 7/2009 | Sampica et al. |
| 7,570,177 B2 | 8/2009 | Reynolds et al. |
| 7,576,680 B1 | 8/2009 | Woodell |
| 7,603,209 B2 | 10/2009 | Dwyer et al. |
| 7,609,200 B1 | 10/2009 | Woodell et al. |
| 7,612,706 B2 | 11/2009 | Honda et al. |
| 7,616,150 B1 | 11/2009 | Woodell |
| 7,633,428 B1 | 12/2009 | McCusker et al. |
| 7,633,430 B1 | 12/2009 | Wichgers et al. |
| 7,633,584 B2 | 12/2009 | Umemoto et al. |
| 7,639,175 B1 | 12/2009 | Woodell |
| 7,664,601 B2 | 2/2010 | Daly, Jr. |
| 7,675,461 B1 | 3/2010 | McCusker et al. |
| 7,693,621 B1 | 4/2010 | Chamas |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,783,427 B1 | 8/2010 | Woodell et al. |
| 7,783,429 B2 | 8/2010 | Walden et al. |
| 7,791,529 B2 | 9/2010 | Filias et al. |
| 7,808,422 B1 | 10/2010 | Woodell et al. |
| 7,814,676 B2 | 10/2010 | Sampica et al. |
| 7,843,380 B1 | 11/2010 | Woodell |
| 7,859,448 B1 | 12/2010 | Woodell et al. |
| 7,859,449 B1 | 12/2010 | Woodell et al. |
| 7,864,103 B2 | 1/2011 | Weber et al. |
| 7,868,811 B1 | 1/2011 | Woodell et al. |
| 7,872,594 B1 | 1/2011 | Vesel |
| 7,889,117 B1 | 2/2011 | Woodell et al. |
| 7,889,118 B1 | 2/2011 | Finley et al. |
| 7,927,440 B2 | 4/2011 | Matsuhira |
| 7,929,086 B2 | 4/2011 | Toyama et al. |
| 7,965,223 B1 | 6/2011 | McCusker |
| 7,965,225 B1 | 6/2011 | Dickerson et al. |
| 8,035,547 B1 | 10/2011 | Flanigan et al. |
| 8,038,498 B2 | 10/2011 | Miyauchi et al. |
| 8,045,098 B2 | 10/2011 | Kitagawa et al. |
| 8,059,025 B2 | 11/2011 | D'Addio |
| 8,068,984 B2 | 11/2011 | Smith et al. |
| 8,072,368 B1 | 12/2011 | Woodell |
| 8,077,078 B1 | 12/2011 | Woodell et al. |
| 8,077,081 B2 | 12/2011 | Bateman et al. |
| 8,102,487 B2 | 1/2012 | Kitagawa et al. |
| 8,118,075 B2 | 2/2012 | Sampica et al. |
| 8,137,498 B2 | 3/2012 | Sampica et al. |
| 8,140,223 B2 | 3/2012 | Whitehead et al. |
| 8,159,464 B1 | 4/2012 | Gribble et al. |
| 8,232,917 B2 | 7/2012 | Scherzinger et al. |
| 8,289,202 B1 | 10/2012 | Christianson |
| 8,296,065 B2 | 10/2012 | Haynie et al. |
| 8,373,580 B2 | 2/2013 | Bunch et al. |
| 8,410,975 B1 | 4/2013 | Bell et al. |
| 8,477,062 B1 | 7/2013 | Kanellis |
| 8,486,535 B1 | 7/2013 | Nemeth et al. |
| 8,493,241 B2 | 7/2013 | He |
| 8,515,600 B1 | 8/2013 | McCusker |
| 8,540,002 B2 | 9/2013 | Sampica et al. |
| 8,558,731 B1 | 10/2013 | Woodell |
| 8,576,112 B2 | 11/2013 | Garrec et al. |
| 8,583,315 B2 | 11/2013 | Whitehead et al. |
| 8,594,879 B2 | 11/2013 | Roberge et al. |
| 8,603,288 B2 | 12/2013 | Sampica et al. |
| 8,634,993 B2 | 1/2014 | McClure et al. |
| 8,639,416 B2 | 1/2014 | Jones et al. |
| 8,643,533 B1 | 2/2014 | Woodell et al. |
| 8,691,043 B2 | 4/2014 | Sampica et al. |
| 8,717,226 B2 | 5/2014 | Bon et al. |
| 8,755,954 B1 | 6/2014 | McCusker et al. |
| 8,773,301 B1 | 7/2014 | Woodell |
| 8,847,794 B2 | 9/2014 | Buratto et al. |
| 8,896,480 B1 | 11/2014 | Wilson et al. |
| 8,909,471 B1 | 12/2014 | Jinkins et al. |
| 8,917,191 B1 | 12/2014 | Tiana et al. |
| 8,936,057 B2 | 1/2015 | Sampica et al. |
| 8,976,042 B1 | 3/2015 | Chiew et al. |
| 9,354,633 B1 | 5/2016 | McCusker et al. |
| 2001/0023390 A1 | 9/2001 | Gia |
| 2001/0050372 A1 | 12/2001 | Krijn et al. |
| 2001/0053648 A1 | 12/2001 | Furukawa et al. |
| 2002/0039070 A1 | 4/2002 | Ververs et al. |
| 2002/0111717 A1 | 8/2002 | Scherzinger et al. |
| 2002/0116125 A1 | 8/2002 | Lin |
| 2002/0116126 A1 | 8/2002 | Lin |
| 2002/0158256 A1 | 10/2002 | Yamada et al. |
| 2002/0179229 A1 | 12/2002 | Chuzles |
| 2002/0185600 A1 | 12/2002 | Kerr |
| 2002/0187284 A1 | 12/2002 | Kinoshita et al. |
| 2003/0021491 A1 | 1/2003 | Brust |
| 2003/0038916 A1 | 2/2003 | Nakano et al. |
| 2003/0043315 A1 | 3/2003 | Umemoto et al. |
| 2003/0071828 A1 | 4/2003 | Wilkins et al. |
| 2003/0089214 A1 | 5/2003 | Fukuta et al. |
| 2003/0093187 A1 | 5/2003 | Walker |
| 2003/0102999 A1 | 6/2003 | Bergin et al. |
| 2003/0156238 A1 | 8/2003 | Hiraishi et al. |
| 2003/0160718 A1 | 8/2003 | Nagasaku |
| 2003/0174396 A1 | 9/2003 | Murayama et al. |
| 2003/0180528 A1 | 9/2003 | Flosenzier et al. |
| 2003/0189606 A1 | 10/2003 | Moon et al. |
| 2003/0195672 A1 | 10/2003 | He |
| 2003/0216859 A1 | 11/2003 | Martell et al. |
| 2003/0222887 A1 | 12/2003 | Wilkins et al. |
| 2004/0044445 A1 | 3/2004 | Burdon |
| 2004/0059473 A1 | 3/2004 | He |
| 2004/0066645 A1 | 4/2004 | Graf et al. |
| 2004/0072575 A1 | 4/2004 | Young et al. |
| 2004/0083038 A1 | 4/2004 | He |
| 2004/0145499 A1 | 7/2004 | Schmidt et al. |

(56) References Cited

U.S. PATENT DOCUMENTS

| | | |
|---|---|---|
| 2004/0160341 A1 | 8/2004 | Feyereisen et al. |
| 2004/0160364 A1 | 8/2004 | Regev |
| 2004/0181318 A1 | 9/2004 | Redmond et al. |
| 2004/0264549 A1 | 12/2004 | Hoole |
| 2005/0004748 A1 | 1/2005 | Pinto et al. |
| 2005/0052451 A1 | 3/2005 | Servantie |
| 2005/0073455 A1* | 4/2005 | Chow ................ G01S 7/295 342/25 F |
| 2005/0126679 A1 | 6/2005 | Kim |
| 2005/0136625 A1 | 6/2005 | Henseler et al. |
| 2005/0150289 A1 | 7/2005 | Osborne |
| 2005/0174350 A1 | 8/2005 | Ridenour et al. |
| 2005/0200502 A1 | 9/2005 | Reusser et al. |
| 2005/0225481 A1* | 10/2005 | Bonthron ............ G01S 7/032 342/175 |
| 2005/0230563 A1 | 10/2005 | Corcoran, III |
| 2006/0004497 A1 | 1/2006 | Bull |
| 2006/0097895 A1 | 5/2006 | Reynolds et al. |
| 2006/0098452 A1 | 5/2006 | Choi et al. |
| 2006/0164284 A1 | 7/2006 | Pauplis et al. |
| 2006/0207967 A1 | 9/2006 | Bocko et al. |
| 2006/0215265 A1 | 9/2006 | Miyatake et al. |
| 2006/0227012 A1 | 10/2006 | He |
| 2006/0244636 A1 | 11/2006 | Rye et al. |
| 2006/0245171 A1 | 11/2006 | Kim et al. |
| 2006/0290253 A1 | 12/2006 | Yeo et al. |
| 2006/0290531 A1 | 12/2006 | Reynolds et al. |
| 2007/0001897 A1 | 1/2007 | Alland |
| 2007/0002078 A1 | 1/2007 | He et al. |
| 2007/0008214 A1 | 1/2007 | Wasiewicz |
| 2007/0013575 A1 | 1/2007 | Lee et al. |
| 2007/0018887 A1 | 1/2007 | Feyereisen et al. |
| 2007/0032951 A1 | 2/2007 | Tanenhaus et al. |
| 2007/0060063 A1 | 3/2007 | Wright et al. |
| 2007/0146364 A1 | 6/2007 | Aspen |
| 2007/0171094 A1 | 7/2007 | Alter et al. |
| 2007/0176794 A1 | 8/2007 | Feyereisen et al. |
| 2007/0179684 A1 | 8/2007 | He |
| 2007/0228586 A1 | 10/2007 | Merrill et al. |
| 2007/0247350 A1 | 10/2007 | Ryan |
| 2007/0279253 A1 | 12/2007 | Priest |
| 2007/0297736 A1 | 12/2007 | Sherman et al. |
| 2008/0018524 A1 | 1/2008 | Christianson |
| 2008/0051947 A1 | 2/2008 | Kemp |
| 2008/0074308 A1 | 3/2008 | Becker et al. |
| 2008/0111731 A1 | 5/2008 | Hubbard et al. |
| 2008/0145610 A1 | 6/2008 | Muller et al. |
| 2008/0180351 A1 | 7/2008 | He |
| 2008/0305721 A1 | 12/2008 | Ohashi et al. |
| 2009/0021397 A1 | 1/2009 | Wipf et al. |
| 2009/0040070 A1 | 2/2009 | Alter et al. |
| 2009/0040772 A1 | 2/2009 | Laney |
| 2009/0046229 A1 | 2/2009 | Umemoto et al. |
| 2009/0148682 A1 | 6/2009 | Higuchi |
| 2009/0152391 A1 | 6/2009 | McWhirk |
| 2009/0153783 A1 | 6/2009 | Umemoto |
| 2009/0164067 A1 | 6/2009 | Whitehead et al. |
| 2009/0207048 A1 | 8/2009 | He et al. |
| 2009/0279030 A1 | 11/2009 | Toyama et al. |
| 2009/0279175 A1 | 11/2009 | Laney et al. |
| 2010/0033499 A1 | 2/2010 | Gannon et al. |
| 2010/0103353 A1 | 4/2010 | Yamada |
| 2010/0297406 A1 | 11/2010 | Schaffer et al. |
| 2010/0312428 A1 | 12/2010 | Roberge et al. |
| 2010/0312461 A1 | 12/2010 | Haynie et al. |
| 2011/0037616 A1 | 2/2011 | Leutelt et al. |
| 2011/0054729 A1 | 3/2011 | Whitehead et al. |
| 2011/0075070 A1 | 3/2011 | Kitagawa et al. |
| 2011/0141405 A1 | 6/2011 | Kitagawa et al. |
| 2011/0165361 A1 | 7/2011 | Sherman et al. |
| 2011/0184594 A1 | 7/2011 | Manfred et al. |
| 2011/0273325 A1 | 11/2011 | Goldman |
| 2011/0282580 A1 | 11/2011 | Mohan |
| 2011/0304479 A1 | 12/2011 | Chen et al. |
| 2012/0053831 A1 | 3/2012 | Halder |
| 2012/0133546 A1* | 5/2012 | Reiter ................ G01S 7/12 342/59 |
| 2012/0150426 A1 | 6/2012 | Conway |
| 2012/0174445 A1 | 7/2012 | Jones et al. |
| 2012/0176497 A1* | 7/2012 | Shadmi ................ G01C 21/00 348/144 |
| 2012/0215410 A1 | 8/2012 | McClure et al. |
| 2013/0041529 A1 | 2/2013 | He et al. |
| 2013/0234884 A1 | 9/2013 | Bunch et al. |
| 2013/0285847 A1* | 10/2013 | Ward ................ G01S 7/2813 342/90 |
| 2014/0009324 A1 | 1/2014 | Ranney et al. |
| 2015/0211883 A1 | 7/2015 | He |
| 2016/0131739 A1 | 5/2016 | Jinkins et al. |

FOREIGN PATENT DOCUMENTS

| | | |
|---|---|---|
| EP | 0 556 351 B1 | 6/1995 |
| EP | 0 962 752 A1 | 12/1999 |
| GB | 0 814 744 A | 6/1959 |
| GB | 1 092 821 A | 11/1967 |
| JP | 01-210328 | 8/1989 |
| JP | 05-200880 | 8/1993 |
| JP | 05-293895 | 11/1993 |
| JP | 06-051484 | 2/1994 |
| JP | H08-220547 A | 8/1996 |
| JP | 09-057779 | 3/1997 |
| JP | 10-156853 | 6/1998 |
| JP | 10-244589 | 9/1998 |
| JP | 2000-141388 | 5/2000 |
| JP | 2004-233590 | 8/2004 |
| JP | 2004-354645 | 12/2004 |
| JP | 2006-218658 | 8/2006 |
| JP | 2006-334912 | 12/2006 |
| JP | 2006-348208 | 12/2006 |
| JP | 2007-206559 | 8/2007 |
| JP | 2007-302398 A | 11/2007 |
| JP | 2008-238607 | 1/2008 |
| WO | WO-93/05634 | 3/1993 |
| WO | WO-2009/133102 A1 | 11/2009 |
| WO | WO-2011/089474 A2 | 7/2011 |

OTHER PUBLICATIONS

English Translation of Japanese Notice of Reasons for Rejection in Japanese Application No. 2016-001165, dated Apr. 25, 2017, 1 page.
Final Office Action on U.S. Appl. No. 14/536,330, dated Jan. 23, 2017, 14 pages.
First Office Action with English Translation of Chinese Application No. 201510005057.5, dated Apr. 25, 2017, 8 pages.
Non-Final Office Action on U.S. Appl. No. 14/270,587, dated May 8, 2017, 16 pages.
Notice of Allowance on U.S. Appl. No. 14/482,681, dated Mar. 28, 2017, 5 pages.
U.S. Office Action on U.S. Appl. No. 14/536,330, dated Aug. 11, 2017.
Corrected Notice of Allowability on U.S. Appl. No. 13/250,798, dated Jan. 12, 2017, 2 pages.
Notice of Allowance for U.S. Appl. No. 14/536,330 dated Dec. 13, 2017. 7 pages.
Non-Final Office Action for U.S. Appl. No. 15/166,191 dated Apr. 16, 2018. 13 pages.
U.S. Appl. No. 11/851,323, filed Sep. 6, 2007, McCusker.
U.S. Appl. No. 11/863,219, filed Sep. 27, 2007, Woodell.
U.S. Appl. No. 11/863,221, filed Sep. 27, 2007, Woodell.
U.S. Appl. No. 11/899,801, filed Sep. 6, 2007, Woodell et al.
U.S. Appl. No. 11/900,002, filed Sep. 6, 2007, Woodell et al.
U.S. Appl. No. 12/167,200, filed Jul. 2, 2008, Woodell et al.
U.S. Appl. No. 12/167,203, filed Jul. 2, 2008, Woodell.
U.S. Appl. No. 12/167,208, filed Jul. 2, 2008, Dickerson et al.
U.S. Appl. No. 12/180,293, filed Jul. 25, 2008, Woodell et al.
U.S. Appl. No. 12/236,464, filed Sep. 23, 2008, Rockwell Collins.
U.S. Appl. No. 12/786,169, filed May 24, 2010, Nemeth et al.
U.S. Appl. No. 13/224,992, filed Sep. 2, 2011, Hufnagel et al.

(56) References Cited

OTHER PUBLICATIONS

U.S. Appl. No. 13/250,307, filed Sep. 30, 2011, Jinkins.
U.S. Appl. No. 13/250,798, filed Sep. 30, 2011, Jinkins.
U.S. Appl. No. 13/627,788, filed Sep. 26, 2012, Rockwell Collins.
U.S. Appl. No. 13/857,955, filed Apr. 5, 2013, Barber et al.
U.S. Appl. No. 13/250,798, filed Sep. 30, 2011, Rockwell Collins.
U.S. Appl. No. 14/301,199, filed Jun. 10, 2014, Rockwell Collins.
U.S. Appl. No. 14/482,681, filed Sep. 10, 2014, Rockwell Collins.
U.S. Appl. No. 14/841,558, filed Aug. 31, 2015, Rockwell Collins, Inc.
"MountainScope™ on a TabletPC," PCAvionics™, printed from website www.pcavionics.com on Aug. 28, 2007, 1 page.
TAWS Class A and Class B, Terrain Awareness and Warning Systems, Universal® Avionics Systems Corporation, Sep. 2007, 6 pages.
"TAWS Terrain Awareness and Warning System," Universal® Avionics, printed from website www.uasc.com on Aug. 28, 2007, 2 pages.
Adams, Charlotte, "Synthetic Vision: Picturing the Future," Avionics magazine, Oct. 1, 2006, printed from website www.aviationtoday.com, 4 pages.
Adams, Charlotte, "Synthetic Vision: Picturing the Future," Avionics magazine, Solutions for Global Airspace Electronics, Oct. 2006, cover and pp. 22-29.
Airports Authority of India, Chapter 7: Visual Aids for Navigation—Lights, available prior to Jan. 1, 2005, retrieved from the internet at: http://www.aai.aero/aai_employees/chapter_7.pdf on Sep. 26, 2014, 33 pages.
Blue Mountain Avionics' Products, printed from website www.bluemountainavionics.com on Aug. 28, 2007, 4 pages.
Brailovsky et al., REVS122: A Radar-Based Enhanced Vision System for Degraded Visual Environments, Proc. of SPIE vol. 9087 908708-1, retrieved from the internet at http://proceedings.spiedigitallibrary.org on Jun. 25, 2014, 13 pages.
Carter, S. P., D. D. Blankenship, M. E. Peters, D. A. Young, J. W. Holt, and D. L. Morse (2007), Radar-based subglacial lake classification in Antarctica, Geochem. Geophys. Geosyst., 8, 003016, doi:10.1029/2006GC001408, 20 pages.
Federal Aviation Administration, Advisory Circular AC 90-106, "Enhanced Flight Vision Systems", initiated by AFS-400, dated Jun. 2, 2010, 55 pages.
Federal Aviation Administration, Aeronautical Information Manual (AIM) Basic Flight Information and ATC Procedures, dated Jul. 24, 2014, 2 pages.
Final Office Action on U.S. Appl. No. 13/250,798 dated Sep. 4, 2014, 22 pages.
Final Office Action on U.S. Appl. No. 13/867,556 dated Jul. 3, 2014, 11 pages.
Final Office Action on U.S. Appl. No. 13/250,307 dated Jun. 11, 2014, 8 pages.
Final Office Action on U.S. Appl. No. 13/250,798 dated Aug. 7, 2015, 21 pages.
First Office Action on Korean Patent Application No. 10-2016-7013740, dated Sep. 19, 2016, 7 pages.
Fountain, J.R., Digital Terrain Systems, Airborne Navigation Systems Workshop (Digest No. 1997/169), IEE Colloquium, pp. 4/1-4/6, Feb. 21, 1997.
G2000, Garmin, printed from website https://buy.garmin.com/shop/shop.do?cID=153&pID=97668 on Jun. 28, 2011, 2 pages.
G3000, Garmin, printed from website https://buy.garmin.com/shop/shop.do?cID=153&pID=66916 on Jun. 28, 2011, 2 pages.
G5000, Garmin, printed from website https://buy.garmin.com/shop/shop.do?cID=153&pID=90821&ra=true on Apr. 20, 2011, 2 pages.
Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.
Kuntman, D., Airborne system to address leading cause of injuries in non-fatal airline accidents, ICAO Journal, Mar. 2000, 4 pages.
McGray et al., Air Operators, Airlines, Manufacturers and Interested Industry Stakeholders & Aero Chart Forum-Utilizing EFVS technology and incorporating it into FAA NextGen, Federal Aviation Administration, Apr. 23 & 30, 2014, 34 pages.
Non-Final Office Action on U.S. Appl. No. 13/250,798 dated Feb. 26, 2016, 9 pages.
Non-Final Office Action on U.S. Appl. No. 13/250,798 dated Mar. 18, 2015, 21 pages.
Non-Final Office Action on U.S. Appl. No. 13/250,798, dated Sep. 9, 2016, 6 pages.
Non-Final Office Action on U.S. Appl. No. 14/301,199 dated Sep. 9, 2015, 18 pages.
Non-Final Office Action on U.S. Appl. No. 14/482,681, dated Dec. 20, 2016, 9 pages.
Non-Final Office Action on U.S. Appl. No. 14/536,330 dated Jul. 13, 2016, 12 pages.
Notice of Allowance for U.S. Appl. No. 11/863,215, dated Oct. 13, 2009, 8 pages.
Notice of Allowance for U.S. Appl. No. 11/863,219, dated Jun. 23, 2009, 7 pages.
Notice of Allowance for U.S. Appl. No. 11/863,221, dated Aug. 2, 2010, 9 pages.
Notice of Allowance for U.S. Appl. No. 11/899,801, dated Aug. 19, 2010, 5 pages.
Notice of Allowance for U.S. Appl. No. 11/900,002, dated Sep. 14, 2010, 5 pages.
Notice of Allowance for U.S. Appl. No. 12/009,372, dated Oct. 13, 2011, 8 pages.
Notice of Allowance for U.S. Appl. No. 12/009,373, dated Jun. 16, 2010, 4 pages.
Notice of Allowance for U.S. Appl. No. 12/009,472, dated Sep. 5, 2013, 8 pages.
Notice of Allowance for U.S. Appl. No. 12/167,200, dated Oct. 28, 2010, 5 pages.
Notice of Allowance for U.S. Appl. No. 12/167,203, dated Jun. 21, 2013, 7 pages.
Notice of Allowance for U.S. Appl. No. 12/167,208, dated Mar. 21, 2011, 8 pages.
Notice of Allowance for U.S. Appl. No. 12/180,293, dated Aug. 4, 2011, 8 pages.
Notice of Allowance for U.S. Appl. No. 12/786,169, dated Mar. 28, 2013, 6 pages.
Notice of Allowance for U.S. Appl. No. 13/538,957, dated Oct. 3, 2013, 13 pages.
Notice of Allowance on U.S. Appl. No. 12/263,282 dated Jan. 29, 2016, 8 pages.
Notice of Allowance on U.S. Appl. No. 13/241,051 dated Aug. 28, 2014, 9 pages.
Notice of Allowance on U.S. Appl. No. 13/247,742 dated Jul. 30, 2014, 9 pages.
Notice of Allowance on U.S. Appl. No. 13/250,798, dated Sep. 28, 2016, 10 pages.
Notice of Allowance on U.S. Appl. No. 14/301,199 dated Mar. 1, 2016, 11 pages.
Office Action for U.S. Appl. No. 11/851,323, dated Aug. 6, 2009, 23 pages.
Office Action for U.S. Appl. No. 11/851,323, dated Dec. 15, 2010, 13 pages.
Office Action for U.S. Appl. No. 11/851,323, dated Jul. 5, 2012, 23 pages.
Office Action for U.S. Appl. No. 11/863,215, dated May 27, 2009, 5 pages.
Office Action for U.S. Appl. No. 11/863,215, dated Nov. 12, 2008, 8 pages.
Office Action for U.S. Appl. No. 11/863,219, dated Dec. 12, 2008, 7 pages.
Office Action for U.S. Appl. No. 11/863,221, dated Dec. 18, 2009, 5 pages.
Office Action for U.S. Appl. No. 11/863,221, dated Dec. 8, 2008, 8 pages.
Office Action for U.S. Appl. No. 11/863,221, dated May 26, 2009, 5 pages.

(56) References Cited

OTHER PUBLICATIONS

Office Action for U.S. Appl. No. 12/009,372, dated Dec. 20, 2010, 10 pages.
Office Action for U.S. Appl. No. 12/009,372, dated Jun. 13, 2011, 9 pages.
Office Action for U.S. Appl. No. 12/009,373, dated Dec. 30, 2009, 14 pages.
Office Action for U.S. Appl. No. 12/009,472, dated Apr. 16, 2012, 16 pages.
Office Action for U.S. Appl. No. 12/009,472, dated Jan. 14, 2011, 14 pages.
Office Action for U.S. Appl. No. 12/009,472, dated Mar. 20, 2013, 15 pages.
Office Action for U.S. Appl. No. 12/009,472, dated Nov. 3, 2011, 15 pages.
Office Action for U.S. Appl. No. 12/009,472, dated Nov. 9, 2012, 15 pages.
Office Action for U.S. Appl. No. 12/167,200, dated Jul. 21, 2010, 6 pages.
Office Action for U.S. Appl. No. 12/167,203, dated Aug. 26, 2010, 9 pages.
Office Action for U.S. Appl. No. 12/167,203, dated Jul. 20, 2011, 6 pages.
Office Action for U.S. Appl. No. 12/167,203, dated Mar. 7, 2013, 5 pages.
Office Action for U.S. Appl. No. 12/167,203, dated Oct. 31, 2011, 5 pages.
Office Action for U.S. Appl. No. 12/167,203, dated Sep. 21, 2012, 6 pages.
Office Action for U.S. Appl. No. 12/167,208, dated Dec. 30, 2009, 10 pages.
Office Action for U.S. Appl. No. 12/167,208, dated Feb. 7, 2011, 8 pages.
Office Action for U.S. Appl. No. 12/167,208, dated Jun. 3, 2010, 11 pages.
Office Action for U.S. Appl. No. 12/167,208, dated Oct. 19, 2010, 8 pages.
Office Action for U.S. Appl. No. 12/180,293, dated Jan. 4, 2011, 5 pages.
Office Action for U.S. Appl. No. 12/180,293, dated Jul. 28, 2010, 8 pages.
Office Action for U.S. Appl. No. 12/263,282, dated Jan. 5, 2012, 10 pages.
Office Action for U.S. Appl. No. 12/786,169, dated Jan. 18, 2013, 14 pages.
Office Action for U.S. Appl. No. 12/892,563, dated Feb. 19, 2013, 12 pages.
Office Action for U.S. Appl. No. 12/976,871, dated Feb. 15, 2012, 8 pages.
Office Action for U.S. Appl. No. 12/976,871, dated Jul. 10, 2012, 4 pages.
Office Action for U.S. Appl. No. 12/976,871, dated May 6, 2013, 5 pages.
Office Action for U.S. Appl. No. 12/976,871, dated Nov. 21, 2012, 5 pages.
Office Action for U.S. Appl. No. 12/976,871, dated Oct. 9, 2013, 5 pages.
Office Action for U.S. Appl. No. 13/183,314, dated Aug. 14, 2013, 11 pages.
Office Action for U.S. Appl. No. 13/183,314, dated Mar. 28, 2013, 12 pages.
Office Action for U.S. Appl. No. 13/224,992, dated Feb. 28, 2013, 10 pages.
Office Action for U.S. Appl. No. 13/250,307, dated Nov. 5, 2013, 11 pages.
Office Action for U.S. Appl. No. 13/474,559, dated Aug. 28, 2013, 10 pages.
Office Action for U.S. Appl. No. 13/474,559, dated Dec. 28, 2012, 8 pages.
Office Action for U.S. Appl. No. 13/538,957, dated Apr. 4, 2013, 19 pages.
Office Action for U.S. Appl. No. 13/538,957, dated Oct. 5, 2012, 18 pages.
Office Action for U.S. Appl. No. 13/743,182, dated Apr. 8, 2013, 10 pages.
Office Action for U.S. Appl. No. 12/786,169, dated Jul. 20, 2012, 8 pages.
Office Action in Japanese Patent Application 2015-116688, dated Aug. 25, 2015, 4 pages.
Office Action in Japanese Patent Application 2015-116716, dated Aug. 25, 2015, 3 pages.
Office Action on U.S. Appl. No. 12/236,464, dated Jul. 12, 2013, 17 pages.
Office Action on U.S. Appl. No. 11/787,460, dated Mar. 19, 2010, 16 pages.
Office Action on U.S. Appl. No. 11/787,460, dated Sep. 16, 2009, 15 pages.
Office Action on U.S. Appl. No. 12/236,464, dated Feb. 11, 2014, 21 pages.
Office Action on U.S. Appl. No. 12/236,464, dated Jun. 22, 2011, 14 pages.
Office Action on U.S. Appl. No. 12/892,563, dated May 7, 2013, 6 pages.
Office Action on U.S. Appl. No. 12/892,563, dated Oct. 10, 2012, 12 pages.
Office Action on U.S. Appl. No. 13/241,051 dated Feb. 27, 2014, 21 pages.
Office Action on U.S. Appl. No. 13/247,742 dated Dec. 3, 2013, 11 pages.
Office Action on U.S. Appl. No. 13/250,798 dated Apr. 23, 2014, 15 pages.
Office Action on U.S. Appl. No. 13/627,788, dated Jul. 28, 2014, 10 pages.
Office Action on U.S. Appl. No. 13/867,556 dated Feb. 7, 2014, 11 pages.
Office Action U.S. Appl. No. 11/787,460, dated Aug. 31, 2010, 18 pages.
Office Action with English Translation received in Korean Patent Application 10-2010-7017278, dated Aug. 26, 2015, 5 pages.
Pictures of DELPHINS, printed from website www.tunnel-in-the-sky.tudelft.nl on Aug. 28, 2007, 4 pages.
REVS Product Information Sheet, Sierra Nevada Corporation, dated May 7, 2014, 2 pages.
Skolnik, Introduction to Radar Systems, McGraw Hill Book Company, 2001, 3 pages.
Skolnik, Radar Handbook (McGraw Hill Book Company), 1990, 23 pages.
Synthetic Vision System, en.wikipedia.org/wiki/Synthetic_vision_system, retrieved Feb. 28, 2013, 4 pages.
Technical Standard Order, TSO-C115b, Airborne Area Navigation Equipment Using Multi-Sensor Inputs, Department of Transportation, Federal Aviation Administration, Sep. 30, 1994, 11 pages.
U.S. Office Action on U.S. Appl. No. 11/900,002 dated Jun. 8, 2010, 7 pages.
U.S. Office Action on U.S. Appl. No. 13/247,742 dated Apr. 16, 2014, 15 pages.
Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9C.5-91-12 vol. 2, Oct. 12-16, 2003.
Van Kasteren, Joost, "Tunnel-in-the-Sky, Synthetic vision simplifies the pilot's job and enhances safety," printed from website www.delftoutlook.tudelft.nl on Aug. 28, 2007, 13 pages.
Walker, GD-Itronix Dynavue Technology, The Ultimate Outdoor-Readable Touch-Screen Display, Rugged PC Review, 4 pages.
Wang et al., A Simple Based on DSP Antenna Controller of Weather Radar, 2001 CIE International Conference, 4 pages.
Notice of Allowance for U.S. Appl. No. 15/166,191 dated Oct. 18, 2108. 8 pages.

* cited by examiner

WEATHER RADAR ENABLED OFFSHORE OPERATION SYSTEM AND METHOD

CROSS-REFERENCE TO RELATED PATENT APPLICATIONS

The present application is related to U.S. application Ser. No. 15/166,191, filed by Jinkins et al. on May 26, 206, U.S. patent application Ser. No. 14/841,558 filed by Jinkins et al. on Aug. 31, 2015, U.S. Pat. No. 8,773,301, U.S. patent application Ser. No. 14/536,330 filed Nov. 7, 2014 by Jinkins et al., now U.S. Pat. No. 9,934,256, U.S. patent application Ser. No. 14/482,681 filed Sep. 10, 2014 by Wood et al., now U.S. Pat. No. 9,733,349, U.S. patent application Ser. No. 14/301,199 filed on Jun. 10, 2014 by McCusker et al, now U.S. Pat. No. 9,384,586, U.S. patent application Ser. No. 13/627,788 filed on Sep. 26, 2012 by Jinkins et al., U.S. patent application Ser. No. 12/892,563 filed on Sep. 28, 2010 by Woodell et al., now U.S. Pat. No. 8,643,533, U.S. patent application Ser. No. 13/250,798 filed on Sep. 30, 2011 by Jinkins et al., now U.S. Pat. No. 9,562,788, U.S. patent application Ser. No. 12/236,464 filed on Sep. 23, 2008 by McCusker et al, now U.S. Pat. No. 8,977,491, U.S. patent application Ser. No. 12/167,200 filed on Jul. 2, 2008 by Woodell et al., U.S. patent application Ser. No. 12/180,293 filed on Jul. 25, 2008 by Woodell et al., now U.S. Pat. No. 8,077,078, U.S. patent application Ser. No. 13/247,742 filed on Sep. 28, 2011 by Wilson et al., now U.S. Pat. No. 8,896,480, U.S. patent application Ser. No. 11/851,323 filed on Sep. 6, 2007 by McCusker, now U.S. Pat. No. 8,515,600, U.S. patent application Ser. No. 11/900,002 on Sep. 26, 2007, now U.S. Pat. No. 7,859,449, U.S. patent application Ser. No. 13/241,051 filed on Sep. 22, 2011 by Tiana et al., now U.S. Pat. No. 8,917,191, U.S. patent application Ser. No. 12/263,282 filed on Oct. 31, 2008 by McCusker et al., U.S. Pat. Nos. 8,896,480 and 8,077,078, all of which are herein incorporated by reference in their entireties and assigned to the assignee of the present application.

BACKGROUND

Aircraft are utilized to deliver equipment and personal to a variety of locations. Helicopters often land at onshore and offshore helipads which are designated landing areas for helicopters providing a clearly marked hard surface. The direct surroundings of a helipad are not always clear of obstacles and that is one of the reasons why visual reference is required for any operations close to the helipad. The Federal Aviation Administration (FAA) regulations allow part of the approach operation to be performed in low visibility conditions, but at some distance from the helipad visual reference must be obtained.

In one aircraft application, helicopters flying instrument flight rules (IFR) during offshore operations (e.g., approaching an offshore platform such as an oil drilling rig, an oil pumping platform, or a ship) must avoid fixed and moving obstacles and see the intended offshore platform for landing. IFR offshore operations often occur in low visibility conditions, such as, heavy fog associated with maritime environments (e.g., maritime fog). Offshore operations can occur in environments with moving ships having heights up to 400 feet. The missed operation point (MOP) for offshore operations is generally 0.6-0.7 nautical miles (NM) from an offshore helipad or platform.

According to a Delta 30° Offshore Standard Instrument Operation (OSIO), a helicopter or rotary wing aircraft approaching an offshore platform is flown into the wind and at a distance of 1.1 NM from the landing site, a delta 30° turn is made either to the right or left depending on the clear area determined by the helicopter operator based on the image provided by the onboard weather radar. When visual reference with the landing site is established before reaching the MOP at 0.6 NM, the pilot proceeds visually to the landing area, otherwise a missed operation must be executed at the MOP.

According to a Parallel Offset OSIO, a helicopter approaching an offshore helipad or platform is flown into the wind and at a distance of 5 NM from the landing site, either a left or right turn is made based on the clear area determined by the helicopter operator based on the image provided by the onboard weather radar. An offset path of 0.5 NM to the left or right of the landing site is established before reaching the decision point altitude at no less than 2 NM from the landing site. The helicopter is flown along the offset path to a 0.7 NM MOP. When visual reference with the landing site is established before reaching the MOP at 0.7 NM from the landing site, the pilot proceeds visually to the landing area, otherwise a missed operation must be executed at MOP. Offshore helicopter approach operations are discussed in the FAA's Advisory Circular AC 90-80B "Approval of Offshore Helicopter Approaches" (Apr. 19, 1992) and "Airborne Radar Approach FAA/NASA Gulf of Mexico Helicopter Flight Test Program," Department of Transportation, (Report No. AFO-507-78-2, January 1980). The new nomenclature of the draft Advisory Circular AC 90-80C "Approval of Offshore Standard Instrument Operations, Airborne Radar Operations, and Helicopter En Route Descent Areas" has been adopted, instead of using the nomenclature of the current AC 90-80B.

SUMMARY

In one aspect, embodiments of the inventive concepts disclosed herein are directed to a radar system, a processor, and memory coupled to the processor. The memory contains program instructions that, when executed, cause the processor to instruct the radar system to provide radar beams and receive radar returns with improved angular and/or range resolution for deriving image data of the external scene topography during offshore operations. The radar system derives the image data using intensity and locations of individualized radar returns determined as a relative location to the radar system.

In a further aspect, embodiments of the inventive concepts disclosed herein are directed to a system for use in a helicopter. The system includes a weather radar system and a display. The weather radar system is configured to process the radar returns to determine a location and an intensity of the radar returns and generate image data representative of an offshore environment during offshore operations. The radar returns are in an X-band or a C-band. The display is in communication with the weather radar system and is configured to display an image associated with the image data.

In a further aspect, embodiments of the inventive concepts disclosed herein are directed to a weather radar system for use in a helicopter. The weather radar system includes an antenna and a control circuit coupled with the antenna. The control circuit is configured to provide radar beams via the antenna toward external surroundings, to receive radar returns, process the radar returns to determine the intensity and location associated with the radar returns, and provide data derived from the radar returns for provision of a radar image. The location is determined with high resolution angle and range.

In a further aspect, embodiments of the inventive concepts disclosed herein are directed to a method of providing radar image data for provision of a radar image on an electronic display during offshore operations to avoid obstacles. The method includes determining an antenna attitude, receiving radar returns from at least one of an X-band or C-band weather radar system, and determining a location associated with each of a number of radar returns using the antenna attitude, a beam sharpening angle, and a range. The method also includes determining an intensity associated with each of the radar returns, and providing the radar image data to the electronic display during offshore operations. The radar image data is derived from the intensity and location of the radar returns.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1A:
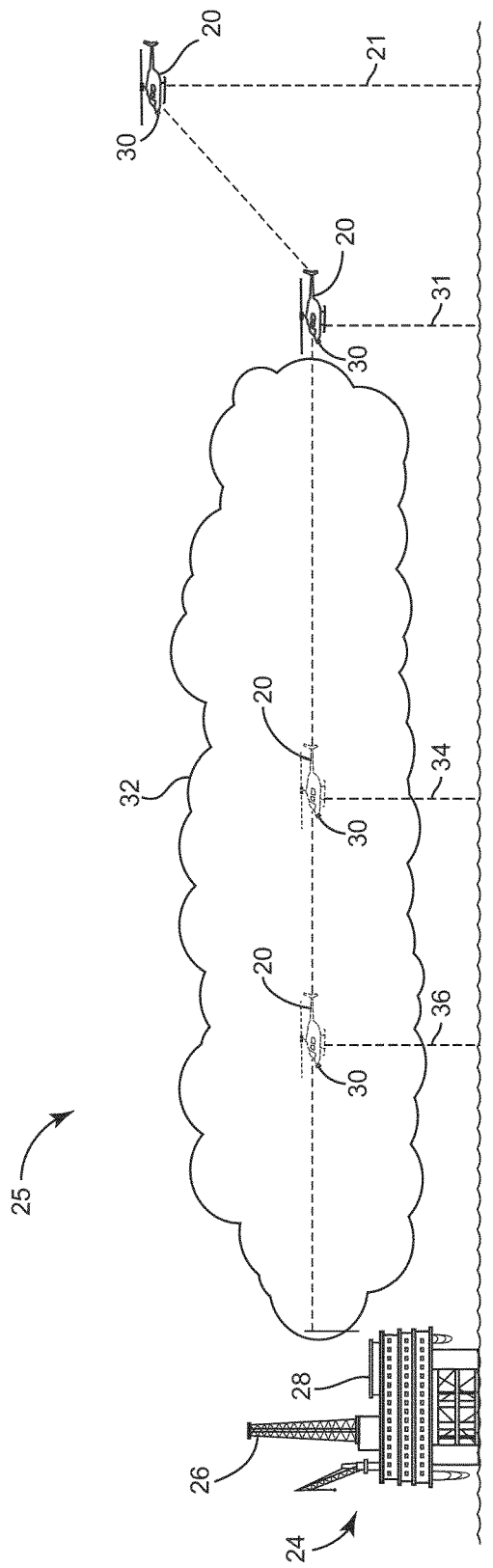
FIG. 1A is a side view schematic illustration of a helicopter equipped with weather radar approaching an offshore platform according to an exemplary embodiment of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

The weather radar system's superior ability to penetrate heavy fog allows the radar system to detect offshore platforms and other objects associated with offshore environments (e.g., maritime environments).

In some embodiments, a weather radar system employs radar beam sharpening technology to significantly increase the azimuthal accuracy, thereby providing sufficient indication of lateral separation to gain operational credit for less lateral clearance with the maritime obstacles in offshore environments. Without beam sharpening technology, conventional radar systems tend to spread the visualization of the sensed obstacles (e.g., the offshore platform) in azimuth with an angular width that is proportional to the width of the antenna beam. Beam sharpening technology produces higher angular resolution radar estimation of the sensed obstacles which reduces the interpreted azimuth errors from the visualization on the radar display in some embodiments. Accordingly, beam sharpening technology advantageously allows obstruction isolation of closely clustered offshore platforms and nearby obstructions in some embodiments. Beam sharpening is performed using several techniques, including but not limited to mono-pulse technique, a sub-aperture radar technique, a deconvolution of a beam point spread function, or any combination thereof in some embodiments.

In some embodiments, enhancing the range resolution provides the capability to identify the target platform by sensing detailed platform shapes and orientation. Correct identification of the intended target platform reduces the possibility of pilots landing on a non-intended platform that is closely spaced in a cluster of platforms including the intended target platform. The range resolution is enhanced by using techniques including but not limited to ultra-wideband pulsing, stepped-frequency compression, pulse compression, or other compression techniques or combinations thereof in some embodiments.

In some embodiments, a weather radar system is used as an imaging sensor to provide a visualization of the surrounding environment during offshore operations. The visualization can be presented to the pilot on a display (e.g., head up display (HUD) or head down display (HDD)), thereby allowing the pilot to see the surrounding environment in low visibility conditions, such as maritime fog. In some embodiments, a Doppler weather radar system is configured to have enhanced resolution (e.g., angular resolution and/or range resolution) for providing an image derived from radar reflections from offshore structures (e.g., petroleum rigs, petroleum platforms, and/or ships) in some embodiments. In some embodiments, the weather radar system operates in a ground mapping mode enhancing the resulting radar image using beam sharpening with optional increased range resolution. In some embodiments, the intensity, is mapped to position using angle and range without using absolute determined position such as provided by a global navigation satellite system (GNSS).

In some embodiments, a weather radar system achieves accurate location determination using an accurate beam sharpening angle. In some embodiments, the weather radar system creates a two dimensional or three dimensional grid containing the spatial density of the intensity of the radar returns. Each radar return has an associated location (e.g., location relative to the radar system) that is based on the radar antenna position in some embodiments. From the radar antenna position, the location of the radar returns is found using the attitude of the antenna, the beam sharpening angle and the range (e.g., specific to that individual radar return) in some embodiments. In some embodiments the radar returns are processed to determine the spatial density of the intensity associated with the radar returns. The spatial density of the intensity can be used to generate an image representing the offshore environment sensed by the radar. A reference image (e.g., the coordinate of the landing site) can be combined with the radar image to provide additional information of the maritime environment that can help the pilot navigate the maritime environment, but the provided reference image is depending on a database and on an absolute positioning and attitude sources which integrity cannot be guaranteed. The image generated by the radar can be generated using only relative positioning and attitude sources. Combining the two independently created images confirms the alignment and colocation of the radar image and the reference image in order to validate the integrity of the positioning and attitude sources.

The radar return data is processed to provide a two-dimensional helicopter situation display (e.g., a plan position indicator (PPI) providing range and azimuth information or plan view display (e.g., top-down display)) or a three dimensional perspective exocentric or perspective egocentric display representative of the offshore environment based on the radar returns as described in U.S. patent application Ser. Nos. 14/841,558, 14/301,199, now U.S. Pat. No. 9,384,586, Ser. No. 14/482,681, now U.S. Pat. No. 9,733,349, and Ser. No. 14/536,330, now U.S. Pat. No. 9,939,526, incorporated herein by reference in their entireties in some embodiments. For example, the radar processing circuit can be embodied as a processor and a non-transitory memory containing program instructions that, when executed, cause the processor to instruct the radar system to provide radar beams and receive radar returns via the antenna and generate image data from the radar returns.

Figure 1B:
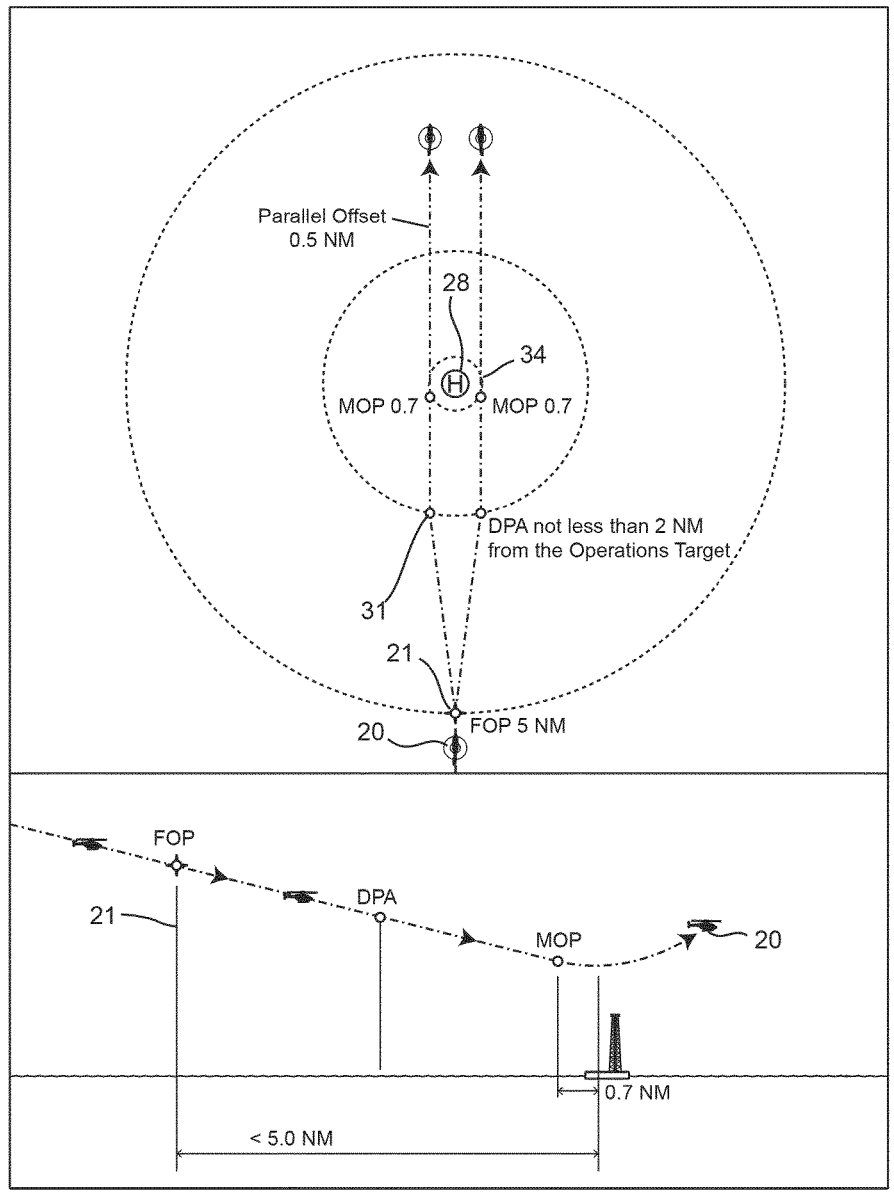
FIG. 1B is a side view and top view schematic illustration of a helicopter equipped with weather radar approaching an offshore platform according to a Parallel Offset OSIO in accordance with an exemplary embodiment of the inventive concepts disclosed herein.
Figure 1C:
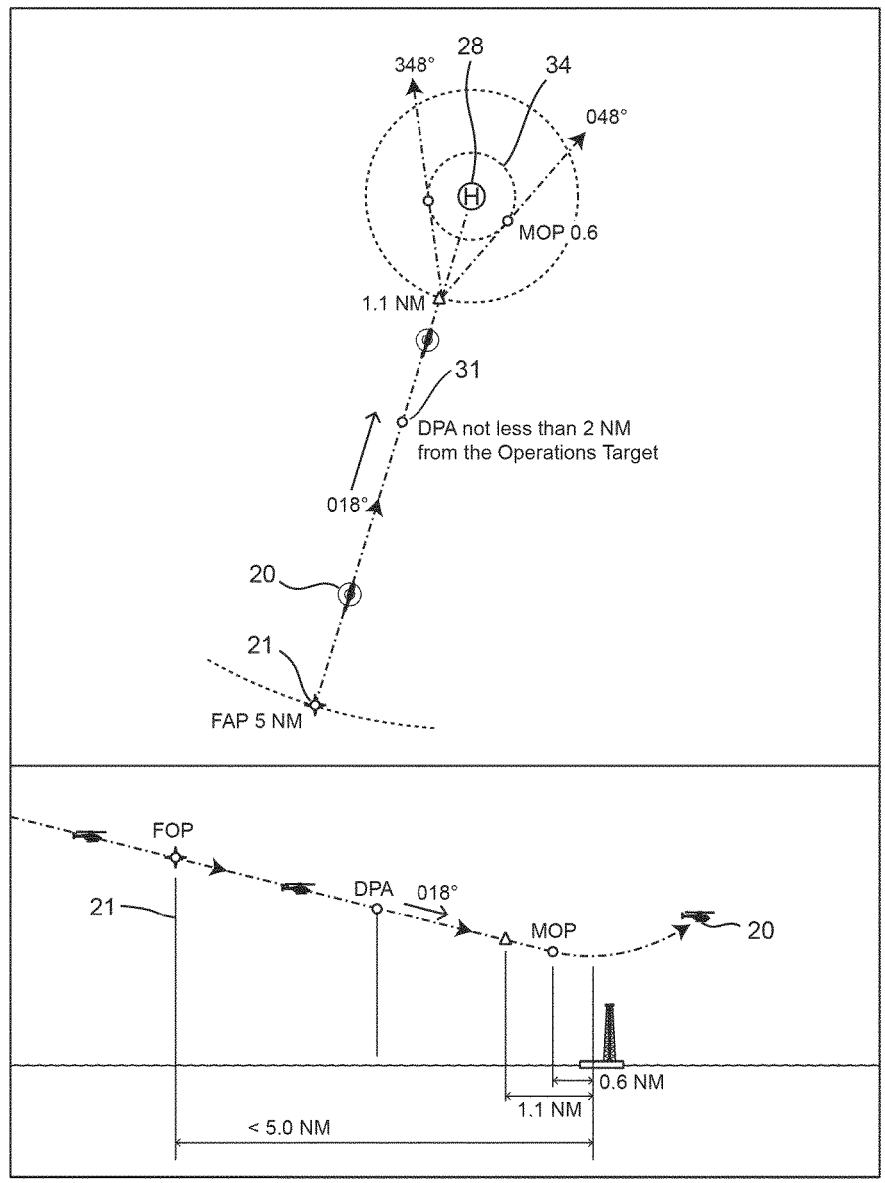
FIG. 1C is a side view and top view schematic illustration of a helicopter equipped with weather radar approaching an offshore platform according to a Delta 30° OSIO in accordance with an exemplary embodiment of the inventive concepts disclosed herein.

Referring to FIG. 1A, an aircraft, such as a helicopter 20, approaches an offshore platform 24 in a maritime environment 25. The offshore platform 24 includes a petroleum rig 26 and a landing site 28. Current FAA regulations prohibit the helicopter 20 from descending below an altitude of 500 feet at location 21 not less than 2 NM from the landing site 28 unless the path of the helicopter 20 is laterally clear of all obstructions by at least 0.5 NM. Obstructions such as ships as tall as 400 feet can be in the path to the landing site 28 on the offshore platform 24. The helicopter 20 is required to sense and avoid all obstructions (other offshore platforms, ships, etc.) using an on-board weather radar, such as a radar system 30 (shown in more detail in FIG. 2). In some embodiments, operational credit is provided to the capabilities of the radar system 30, which reduces the minimal distance for obtaining visual reference with the target platform, resulting in higher success rates of completing offshore operations in low visibility IFR conditions. With reference to FIGS. 1B-C, the helicopter 20 performs an approach according to the Parallel Offset OSIO or the Delta 30° OSIO in some embodiments.

In some embodiments, the helicopter 20 using the radar system 30 descends to an altitude 50 feet above the altitude of the landing site 28 (e.g., to an altitude of 200 feet) at a distance of at least 0.6 NM (e.g., at a location 31 between 2.0 NM and 0.6 NM) from the landing site 28. The radar system 30 senses obstacles and the offshore platform 24 at a distance of 2.0 NM through a fog 32. In some embodiments, a missed operation point (MOP) 34 is located at a distance of 0.6-0.7 NM from the landing site. When visual reference with the offshore platform 24 is established before reaching the MOP, the pilot proceeds visually to the landing site 28, otherwise a missed operation must be executed at the MOP. With the radar system 30 employed in the helicopter 20, Applicants believe that a MOP at location 36 closer to the offshore platform 24 can be achieved in some embodiments.

Although offshore environments are discussed herein, the radar system 30 can be utilized with other environments. Although offshore platform applications are discussed herein, the radar system 30 can be utilized with other applications, including but not limited to military applications, rescue applications, policing applications, construction applications, helicopter delivery applications, and shipping applications. In addition, the radar system 30 can be utilized with other types of aircraft than helicopters including unmanned or unmanned aircraft and drones.

Figure 2:
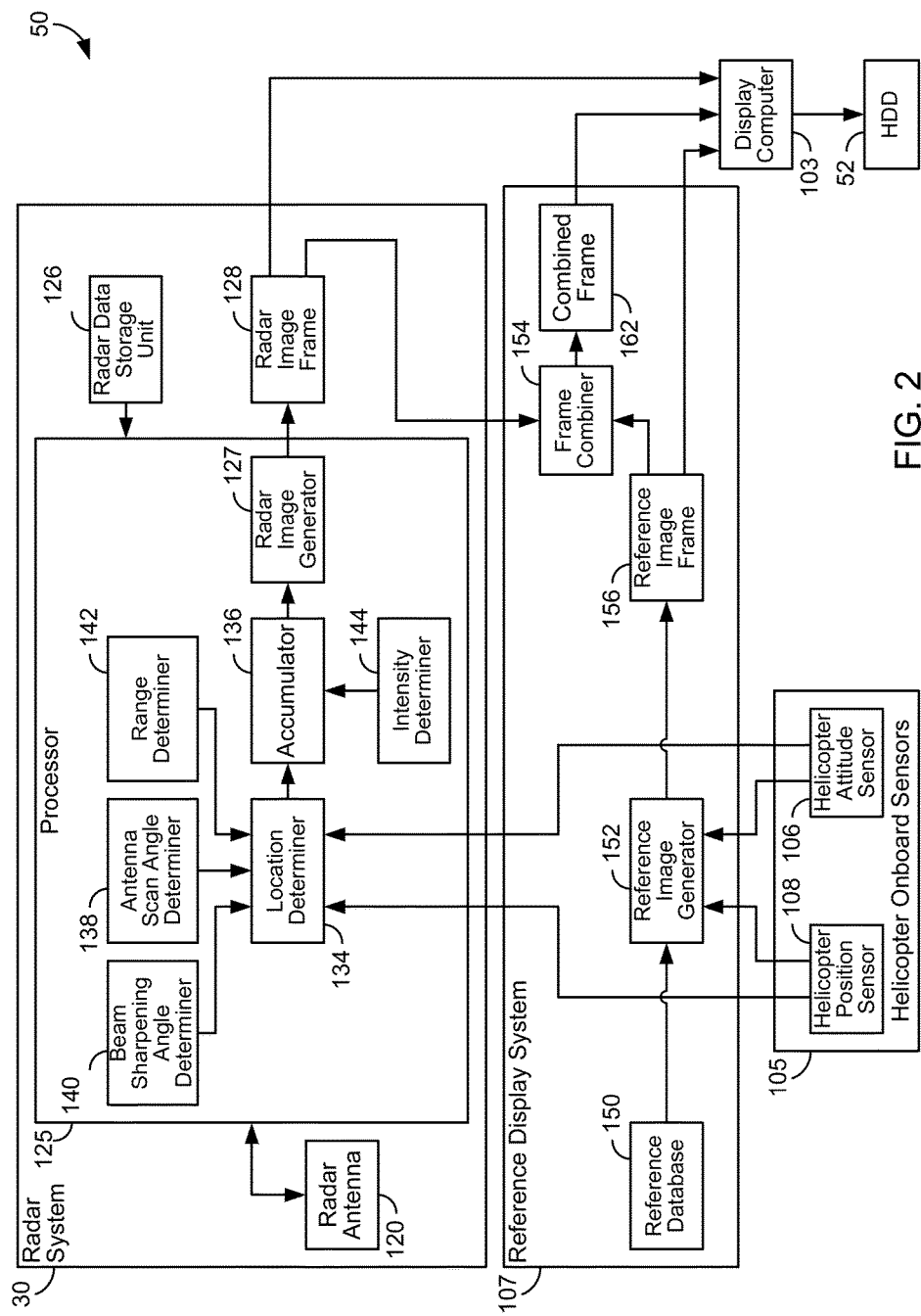
FIG. 2 is a schematic general block diagram of a display system for the helicopter illustrated in FIG. 1A, the display system is for providing an image derived from radar data according to another embodiment of the inventive concepts disclosed herein.

With reference to FIG. 2, the helicopter 20 (FIG. 1A) includes a display system 50 which can be used in offshore operations, such as, petroleum rig operations, to view the maritime environment 25 (FIG. 1A). The display system 50 includes display 52 embodied as head down display (HDD) or other flight display. In some embodiments, the display 52 can also be embodied as a head up display (HUD). In some embodiments, the display 52 is provided as a wearable display. The display system 50 can be a weather radar system in communication with a separate display.

The display 52 can be used to provide information to the flight crew, thereby increasing visual range and enhancing decision-making abilities. In some embodiments, the display 52 is configured to display a reference image (e.g., top-down image) of the maritime environment around the helicopter 20. In another embodiment, the display 52 is configured to display a perspective egocentric image or perspective exocentric image. The display 52 can be implemented using any of a variety of display technologies, including CRT, LCD, organic LED, dot matrix display, and others.

Advantageously, real time radar data can be provided to provide a real time, all weather detection of obstacles and the offshore platform 24 in the maritime environment 25 in some embodiments.

Referring to FIG. 2, the display system 50 uses radar data from a radar system 30 to provide an image to display 52. The display system 50 is in communication with or includes the radar system 30 and onboard sensors 105 and can include or be in communication with a reference display system 107 in some embodiments. The reference display system 107 is optional in some embodiments. The radar system 30 includes a radar antenna 120, a processor 125, a radar data storage unit 126, and an image frame memory 128 in some embodiments.

The onboard sensors 105 are associated with navigation equipment and flight control devices in some embodiments and can include one or more of an inertial navigation system (INS), an inertial reference system (IRS), a flight computer, a barometric altimeter, a radar altimeter, a global navigation satellite system (GNSS) receiver, air speed sensors, heading sensors, etc. The onboard sensors 105 include an attitude sensor 106 and a position sensor 108 in some embodiments.

The position sensor 108 is any device or system for providing an electronic signal or data representing position of the helicopter 20. In some embodiments, the position includes a position parameter (e.g., latitude and longitude) and an altitude parameter. The position sensor 108 is a GNSS receiver or INS in some embodiments. The altitude can be provided by a GNSS receiver, an altitude sensor (e.g., barometric sensor), a radio altimeter, or other device. In some embodiments, the position also includes velocity and acceleration parameters associated with position (e.g., for predicting future position of the helicopter 20).

The attitude sensor 106 is any device for providing an electronic signal or data representing attitude of the helicopter 20. The attitude includes a heading parameter, a pitch parameter, a yaw parameter, and a roll parameter in some embodiments. In some embodiments, the position sensor 108 and the attitude sensor 106 are parts of a single positioning or navigation sensor system, such as a GNSS receiver, INS, or integrated GNSS/INS. In some embodiments, the attitude also includes angular velocity and acceleration parameters associated with attitude (e.g., for predicting future attitude of the helicopter 20). In some embodiments, the radar antenna 120 has an attitude sensor for providing attitude and changes in attitude of the radar antenna 120 with respect to the helicopter 20. The attitude of the radar antenna 120 relative to the attitude of the helicopter can be represented by a scan angle parameter for the radar antenna 120.

The radar system 30 receives data from the onboard sensors 105 and provides radar image data for display by the display system 50. The radar system 30 is a weather radar system generally located inside the nose of the helicopter 20 in some embodiments. The radar system 30 can be a weather radar system, such as, a Multiscan™ radar system from Rockwell Collins, Inc. configured as described herein. The radar system 30 utilizes a split, half or sub-aperture or other technique for obtaining radar data associated with external surroundings in some embodiments. The radar system 30 can use the split or sub-aperture techniques of the radar systems described in U.S. application Ser. Nos. 14/841,558, 13/627,788, 12/892,563, 13/250,798, 12/236,464, and 12/167,200 and U.S. Pat. No. 8,077,078, incorporated herein by reference in their entirety and assigned to the assignee of the present application. The type of the radar system 30 and data gathering techniques are not discussed in the specification in a limiting fashion.

The processor 125 uses radar data stored in the radar data storage unit 126 and the data from the onboard sensors 105 to provide and store radar image data in the image frame memory 128. The radar data can be provided directly from the transmit/receive circuits associated with the radar antenna 120 or be stored in the processor 125 in some embodiments. The processor 125 includes a location determiner 134, an accumulator 136, and an antenna scan angle determiner 138, a beam sharpening angle determiner 140, a range determiner 142, an intensity determiner 144, and a radar image generator 127. The accumulator 136, the location determiner 134, the radar data storage unit 126, the antenna scan angle determiner 138, the beam sharpening angle determiner 140, the range determiner 142, the intensity determiner 144, and the radar image generator 127 are software modules, circuits, or combinations thereof in some embodiments.

The location determiner 134 uses data from the onboard sensors 105 and from the radar data storage unit 126, the antenna scan angle determiner 138, the beam sharpening angle determiner 140, and the range determiner 142 to identify a location associated with returns received at the radar antenna 120 in some embodiments. The locations are relative to the helicopter 20 or the radar system 30 (e.g., the radar antenna 120) and are determined without the use of an absolute position source (e.g., a GNSS receiver) in some embodiments. Data associated with the radar returns are stored in the radar data storage unit 126 in some embodiments. The location determiner 134 uses the position of the radar antenna 120, the attitude of the helicopter 20, the antenna scan angle, the beam sharpening angle, and the range to determine the location of the radar returns in some embodiments. The intensity determiner 144 determines an intensity associated with the radar returns in some embodiments. The intensity of the collection of radar returns is accumulated by location in the accumulator 136 in some embodiments. The accumulated intensity by location is used by the radar image generator 127 to provide the radar image data in some embodiments.

The processor 125 causes the radar antenna 120 to provide radar signals or beams and to receive radar returns (e.g., weather radar return data). The processor 125 is an electronic processor that processes the radar returns and provides the radar data associated with the radar returns to the radar data storage unit 126. The radar signals and radar returns are in the X-band or C-band in some embodiments.

The radar system 30 provides the radar data (e.g., weather radar return data) to the radar data storage unit 126 in one embodiment. The radar data can be processed and filtered for various weather sensing functions as well as location functions. In some embodiments, the radar image generator 127 provides the radar image data (e.g., in image frame format) for storage in the image frame memory 128 using the accumulated returns from the accumulator 136. In some embodiments, the accumulator 136 determines spatial density of the intensity by area or volume to create the radar image data. The spatial density is used by the radar image generator 127 to provide the radar image data indicative of an intensity of reflections from objects at locations associated with that area or volume in some embodiments.

The image frame memory 128 is a video or graphic electronic memory in some embodiments. The radar image data represents a plan position indicator view, a plan view, a perspective exocentric, or perspective egocentric view image in some embodiments. The radar image generator 127 and the accumulator 136 are an electronic memory, processor circuitry, or combination thereof in some embodiments. In some embodiments, the radar image generator 127 and accumulator 136 are part of a digital signal processor or the processor 125 or is a software module executing on the digital signal processor or the processor 125. The accumulator 136 is embodied as a register in some embodiments. The radar data storage unit 126 is an electronic memory in some embodiments.

The radar data associated with the external surroundings can represent sensed objects and the location of the sensed objects. Objects include ships, platforms, etc. Improved angular resolution and range resolution techniques discussed in U.S. patent application Ser. No. 14/536,330 filed Nov. 7, 2014 by Jinkins et al. incorporated herein by reference in its entirety allows the location of the objects to be more accurately determined and represented in the radar image data in some embodiments. The radar system 30 can utilize clutter suppression and Doppler filtering to improve performance in some embodiments.

In some embodiments, the radar system 30 provides radar data representing a 120 degree field of view in accordance with a weather radar sweep. In some embodiments, the sweep is directed toward the path of the helicopter 20. In yet some other embodiments, the sweep is directed towards the location of the landing site. The width and direction of the sweep can be varied in certain embodiments. Various types of sweeps, beam widths, sweep patterns, and sweep speeds can be utilized without departing from the scope of the inventive concepts disclosed herein.

The radar system 30 embodied as a weather radar allows existing avionic equipment to be used as a real-time sensor for providing a radar-derived image of the external scene topography to the pilot in some embodiments. The image or representation generated by the radar system 30 is provided on the display 52 can provide situational awareness to the pilot in some embodiments. In other embodiments, the image or representation generated by the radar system 30 is provided on the display 52 can be part of an offshore operations system approved for use with closer MOPs.

The radar system 30 advantageously provides increased range resolution in some embodiments. The increased resolution in range and angle allows a higher resolution for location determination by the location determiner 134 and hence higher image resolution to be provided on the display 52 in some embodiments.

According to some embodiments, the radar system 30 uses a beam sharpening method to achieve increased angular resolution. In some embodiments, the radar system 30 uses techniques, such as, beam sharpening (e.g., horizontal beam sharpening) and de-convolution of the beam point spread function for improved angular resolution. In some embodiments, the radar system 30 can use beam sharpening as a process that improves the antenna-induced poor angular resolution (e.g., due to the beam width). There are many methods that can be used such as: Monopulse Radar, Sub-Aperture Radar or Split-Aperture Radar, etc. Mathematical methods can be utilized to determine a center of the radar returns from an object like the offshore platform 24, ships and other obstacles. Techniques for beam sharpening and determining beam sharpening angles and directions of radar objects are discussed in U.S. patent application Ser. Nos. 13/627,788, 12/892,563, 13/250,798, 12/236,464, and 12/167,200 and U.S. Pat. No. 8,077,078 incorporated herein by reference in their entireties.

The radar system 30 uses the radar antenna 120 that toggles between transmitting and receiving on the full aperture and transmitting on the full aperture while receiving on the partial aperture in some embodiments. These techniques can be used to accurately estimate at which angle the radar return was located within the radar beam in some embodiments. The received returns are processed to determine a high resolution estimate of a beam sharpening angle that is relative to the boresight of the antenna in some embodiments. According to some embodiments, the returns are processed using a complex conjugate multiplication method to determine the beam sharpening angle determined by the beam sharpening angle determiner 140. The processing can be related to sequential lobing processing but is executed in the phase domain as opposed to the common amplitude domain in some embodiments.

In some embodiments, the radar system 30 uses sequential lobing techniques where two antennas that are close to the same place may be used, going back and forth between the two antennas. An amplitude signature or phase signature that varies between the two halves of the antennas may be used to obtain data associated with the returned radar reflection from sensed objects (e.g., an object such as ships or platforms). Sequential lobing generally does not use phase comparisons with moving objects due to Doppler-induced phase changes that contaminate the phase center measurement. However, using a complex conjugate multiply method allows the Doppler-induced phase changes to be removed by cancellation. Therefore, a change in phase center between multiple different sub-apertures may be determined and used to determine the beam sharpening angle associated with the returned radar reflection from a sensed object.

In some embodiments, the effective waveform bandwidth of the radar system 30 is increased to increase range resolution. To provide higher range resolution, the radar system 30 provides ultra-wideband radar (UWB) pulses (e.g., extremely narrow pulses with high power), or provides intra pulse compression (frequency of phase modulation of the transmitted pulse) in some embodiments. Frequency coding techniques including the common linear frequency modulation (LFM) or chirp method and discrete coded segments within the pulse are utilized in some embodiments. Phase coding techniques including binary phase codes as well as various polyphase codes can be utilized in some embodiments. To provide higher range resolution, the radar system 30 provides interpulse pulse compression or stepped frequency compression (e.g., successive pulses with discrete increasing frequency steps) in some embodiments. In some embodiments, stepped frequency compression advantageously achieves high effective bandwidth with narrow instantaneous bandwidth. The receive bandwidth is smaller, has lower noise bandwidth, and a higher signal to noise ratio in some embodiments. Analog-to-digital sampling rates are lower (vs. pulse-compression) in some embodiments. In addition, the stepped frequency compression also has a smaller peak power (e.g., when compared to impulse), provides flexible transmit frequency control, can "hop" over restricted or undesired transmit frequencies, enables adaptive/cognitive frequency use, and rejects later received clutter from earlier transmit pulses in some embodiments. Further, the stepped frequency compression techniques can provide returns from clutter in ambiguous ranges that have frequencies that are different from returns from objects and rejects ambiguous clutter returns in the receiver IF filter of the radar system 30 in some embodiments. Stepped frequency compression generally does not achieve range resolution with a single pulse, requires transmit, receive and processing of a group of pulses for any one bin, and has more pronounced range-Doppler coupling (e.g., different Doppler shifts for each frequency) in some embodiments.

The processor 125 can be any hardware and/or software processor or processing architecture configured to execute instructions and operate on navigational and radar data. The processor 125 can be capable of determining navigational information such as altitude, heading, bearing, location, and changes thereof based on data from the onboard sensors 105. The processor 125 can be, or can include one or more microprocessors, an application specific integrated circuit (ASIC), a circuit containing one or more processing components, a group of distributed processing components, circuitry for supporting a microprocessor, or other hardware configured for processing.

In some embodiments, the display system 50 includes the reference display system 107 including a reference database 150, a reference image generator 152, a frame combiner 154, a reference image frame memory 156, and a combined image frame memory 162. Reference image frame memory 156 and the combined image frame memory 162 are similar to the image frame memory 128. In some embodiments, the display system 50 is configured to provide a combined image using the radar image data stored in the image frame memory 128 and a reference image stored in the reference image frame memory 156.

The reference image generator 152 is configured to provide an image based upon position as sensed by onboard sensors 105 and reference feature data stored in the reference data base 150. The reference image is generated as a plan position indicator view, a top-down view, a perspective exocentric, or perspective egocentric view in some embodiments. The reference image can include a textual or graphic indication of the location of the offshore platform 24, other platforms, and the landing site 28 in some embodiments. In some embodiments, a user interface can be used to input a selected platform, route, or landing location.

In some embodiments, the reference database 150 is memory unit storing reference feature data indicating locations of objects in the maritime environment referenced to absolute location. In some embodiments, the reference image generator 152 and the frame combiner 154 are software modules (e.g., executed on processor 125), circuits, or combinations thereof in some embodiments. A hardware platform associated with the radar system 30 (e.g., the processor 125), the display computer 103, an SVS, or an EVS can be used to provide the operations of the reference display system 107.

In some embodiments, the frame combiner 154 receives the reference image data from the reference image frame memory 156 or reference image generator 152, receives the radar image data from the image frame memory 128 or the radar image generator 127, and provides combined image data to the combined image frame memory 162. The combined image data can be displayed on the display 52 via display computer 103, respectively. In some embodiments, both the reference image data and the radar image data are generated from the same viewpoint using the same projection method so that both images are in the same location, format and size and are overlaid upon each other to provide the combined image data. In some embodiments, the radar image data is generated only using relative positioning and attitude sources and the reference image data is generated using absolute positioning and attitude sources. In some embodiments, the reference image data has priority over the radar image data so that sensed images associated with the radar image data are not blocking or overwriting the features in the reference image data. Other merging techniques can be utilized by the frame combiner 154.

In some embodiments, a location translation operation is performed by the radar image generator 127 to project the radar measurement data into radar image data. In some embodiments, the radar image generator 127 is using a projection viewpoint reference for generating the radar image data that is using the same location and attitude reference as the projection viewpoint that the reference image generator 152 is using for generating the reference image data to generate a plan position indicator view, a top-down view, a perspective exocentric, or perspective egocentric view.

A flow can be performed by the display system 50 in some embodiments similar to flow 300 discussed in U.S. patent application Ser. No. 14/841,558 and U.S. application Ser. No. 15/166,191. The processor 125, reference display system 107, or other computing platform can execute software to provide an image while the helicopter 20 is involved in offshore operations in response to helicopter sensor parameters and radar data. The helicopter sensor parameters from the onboard sensors 105 and the radar returns received by the radar antenna 120 are processed to determine locations and intensity associated with the radar returns to provide locations which have an intensity of the radar return. In some embodiments, these radar returns with their associated location and intensity are accumulated over an area or volume at an operation 136. The locations are determined as relative locations from the helicopter 20, radar system 30 or radar antenna 120 in some embodiments.

Figure 3A:
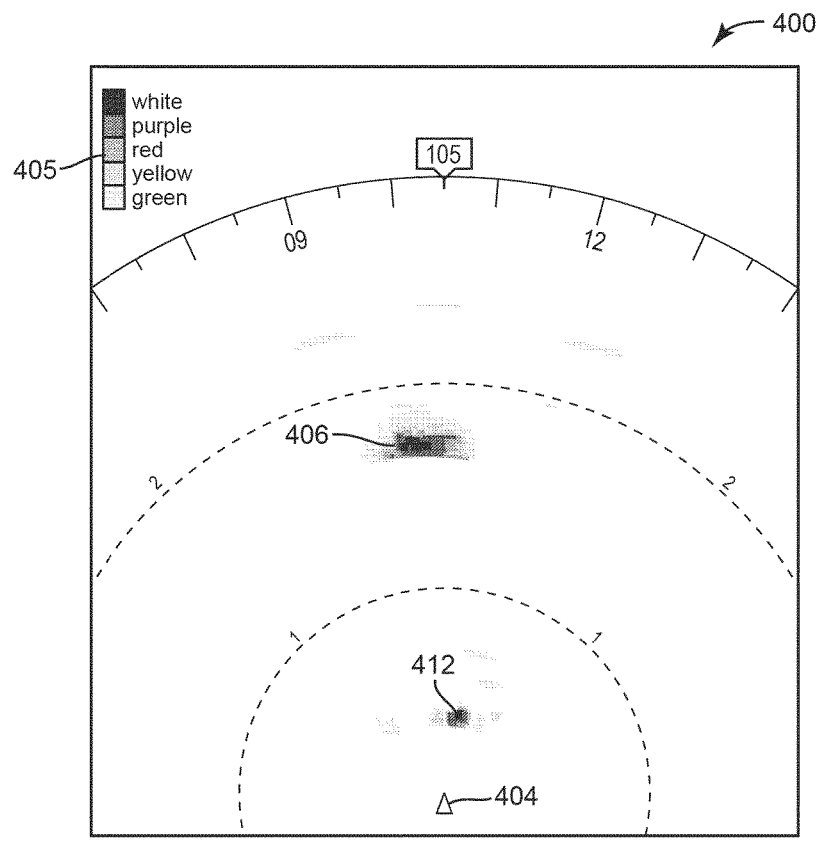
FIG. 3A is an illustration of a top-down radar image of an offshore environment derived from radar data provided by a conventional radar display system for the helicopter illustrated in FIG. 1.
Figure 3B:
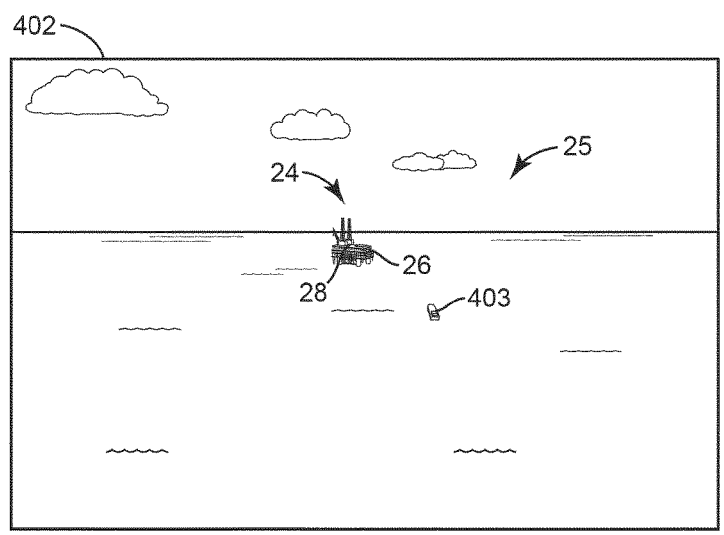
FIG. 3B is an illustration of the offshore environment associated with the top-down image of FIG. 3A.

With reference to FIG. 3A, an image 400 of the maritime environment 25 (shown in FIG. 3B) of the radar data associated with the radar returns obtained by a radar system without beam sharpening is displayed. The image 400 is a plan position indicator (PPI) or top-down view of a real world scene 402 including the offshore platform 24 (including the petroleum rig 26 and landing site 28) and a ship 403 shown in FIG. 3B. A representation 404 of the position of the helicopter 20 is shown approximately 1.75 NM from the landing site 28. A region 406 represents radar returns from the offshore platform 24 associated with the offshore platform 24 and has a much wider expanse than the width of the offshore platform 24 in real world dimensions. The metal material and shape associated with the offshore platform 24 results in high intensity returns over a large area in contrast with the water surface which has relatively low intensity returns. The intensity of returns is represented by colors where levels above 24 decibels relative a return of a drop of rain with a diameter of 1 millimeter (mm) (dBZ) are represented by the color white, levels between 24 and 12 dBZ are represented by the color pink, levels between 12 and 4 dBZ are represented by the color red, levels between 4 and −4 dBZ are represented by the color yellow, levels between −4 dBZ and −0 dBZ are represented by the color pink, and minimal or zero intensity levels are represented by the color black. A key 405 shows an exemplary color level representation. The levels discussed above are exemplary only.

The reflected radar return of the real world offshore platform 24 is visualized by the region 406. The region 406 has a lateral expanse of approximately 0.5 NM with the lateral expanse of the core being 0.25 NM. The region 406 has a depth of approximately 0.25 NM with the core being 0.1 NM. The large expanse makes it difficult to estimate the actual location of the offshore platform 24 using the radar image. The image 400 also includes a region 412 associated with an obstacle. The obstacle is a ship 403 in the path between the region 406 and the representation 404 of the position of the helicopter 20. The region 412 has a much broader expanse and depth than the real world dimensions which make it more difficult to estimate a precise location of the obstacle.

Figure 4A:
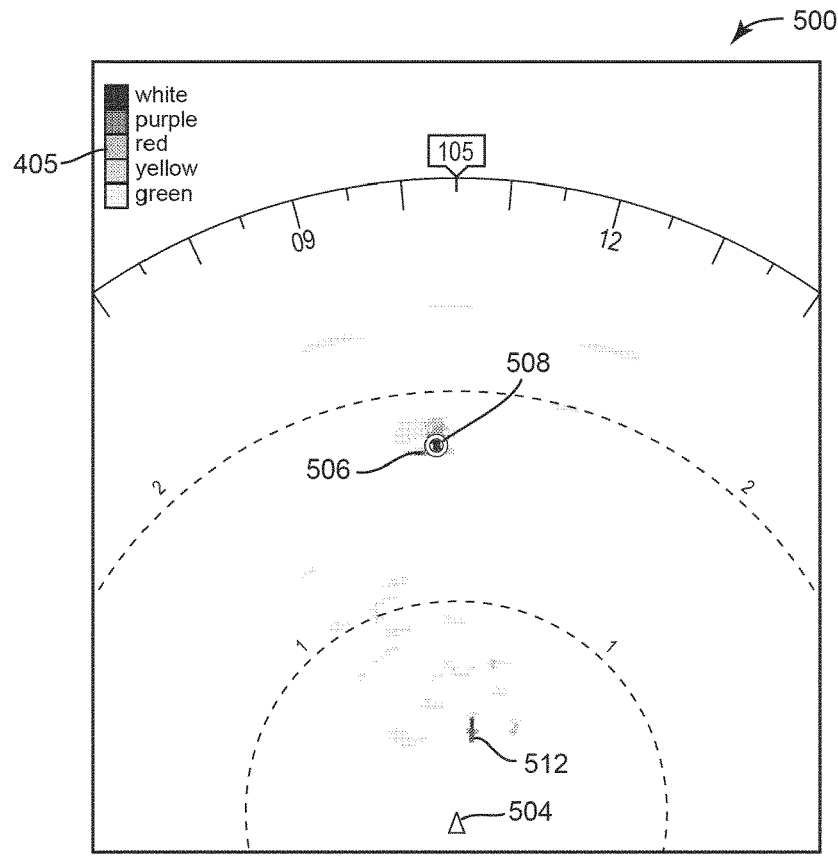
FIG. 4A is an illustration of a top-down radar image of the offshore environment illustrated in FIG. 1A provided by the display system illustrated in FIG. 2 according to yet another exemplary embodiment of the inventive concepts disclosed herein.
Figure 4B:
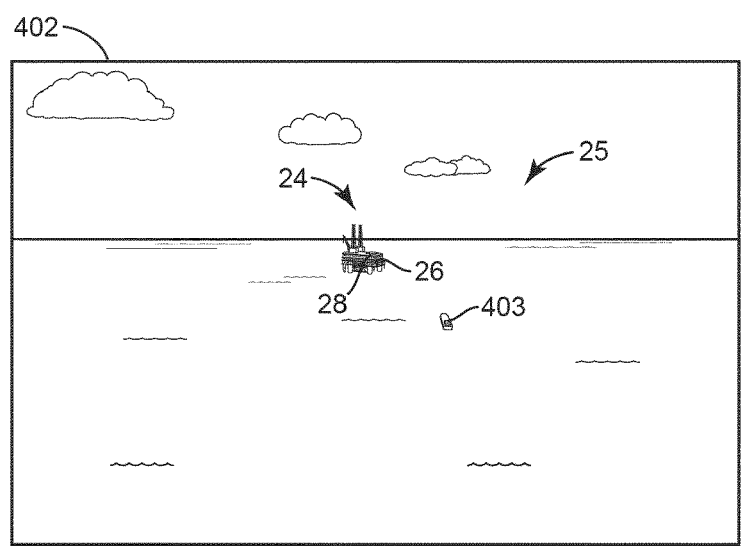
FIG. 4B is an illustration of the offshore environment associated with the top-down image of FIG. 4A.

With reference to FIG. 4A, an image 500 of the maritime environment 25 (shown in FIG. 4B) derived from the radar data associated with the radar returns obtained by the radar system 30 with beam sharpening is displayed. The image 500 is a plan position indicator (PPI) or top-down view of the maritime environment 25 represented by the image 402 (FIG. 4B). A representation 504 of the position of the helicopter 20 is shown 1.75 NM from a landing site symbol 506. A region 508 represents reflections from the offshore platform 24 and has a narrower expanse than the region 406 (FIG. 3A).

The region 508 has a lateral expanse of less than 0.25 NM with the lateral expanse of the core being less than 0.1 NM. The region 508 has a depth of approximately 0.20 NM with the core being less than 0.1 NM. The smaller expanse of region 508 makes it easier to estimate a more accurate location of the offshore platform 24 using the radar data and allows a pilot to safely get closer to the offshore platform 24 before visually identifying it and confirming its actual location. The current lateral separation of 0.5 NM for the parallel offset OSIO procedure and the Delta 30° OSIO procedure is based on radars without beam sharpening that have a large expanse of the visualized radar reflection. Beam sharpening allows the pilot to safely use less lateral separation, which would result in the MOP also positioned closer to the offshore platform. Even small reductions in the distance of the MOP can result in higher possibilities of visual confirmation and less missed approaches in the fog 32 (FIG. 1A). In addition, larger expanses of region 508 can result in difficulty in distinguishing groups of offshore platforms in a small area as the returns for the group would appear as one large region and increases the possibility of landing at the wrong offshore platform.

The image 500 also includes a region 512 which identifies an obstacle. The obstacle is the ship 403 in the path between the region 508 and the representation 504 of the position of the helicopter 20. The region 512 has a narrower expanse than the region 412 which makes it possible to estimate a more accurate location of the obstacle in order to safely avoid the obstacle. In some embodiments, the enhanced processing performed by the radar system 30 allows a ship to be more readily identified as compared to offshore platforms. The longer, thinner profile of the region 512 indicates that it is more likely a ship traveling toward or away from the helicopter 20 as opposed to an offshore platform which has a larger lateral expanse with respect to radar returns.

In some embodiments, a landing site symbol 506 can be added to the visualization on the displayed radar image. In some embodiments, the visualization of the landing site symbol 506 is based on the absolute coordinates of the landing site and a projection of those absolute coordinates to local display coordinates. For a PPI display those local coordinates are azimuth and range from the position of the helicopter taking into account the attitude of the antenna. For a top-down view those local coordinates could be longitudinal distance and lateral distance from the position of the helicopter taking into account the attitude of the antenna. Colocation of the region 508 and the landing site symbol 506 validates the integrity of the absolute positioning and attitude sources and validates the integrity of the coordinate of the landing site.

Figure 5:
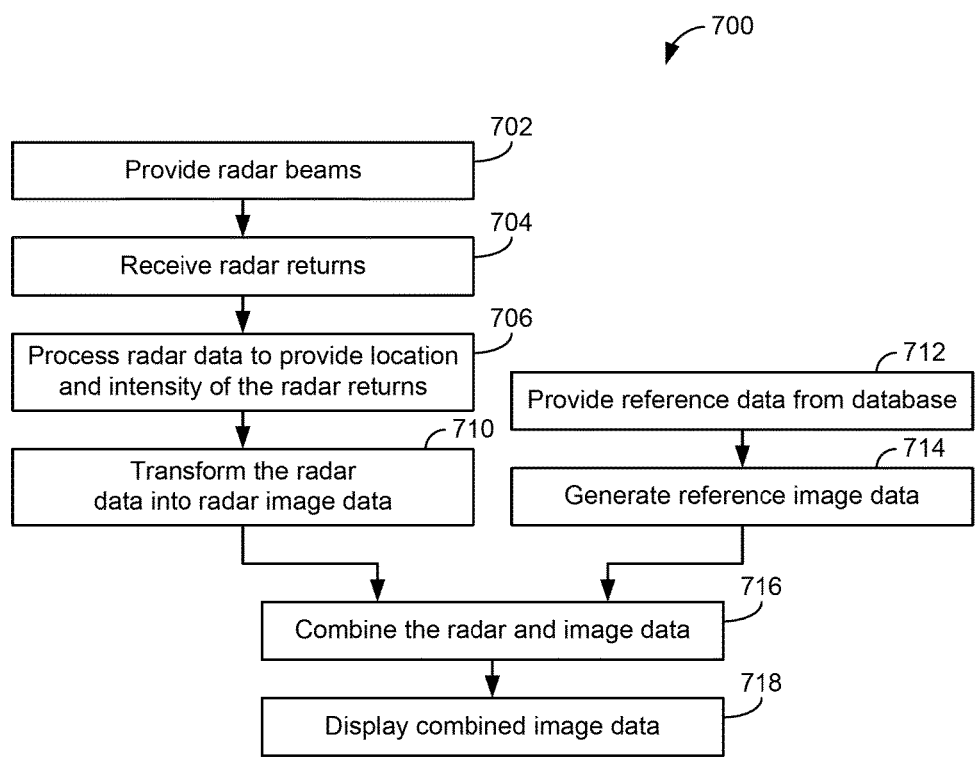
FIG. 5 is a flow diagram showing operations for the generation of image data for the display system illustrated in FIG. 2 in accordance with some embodiments of the inventive concepts disclosed herein.

With reference to FIG. 5, a flow 700 can be performed by the display system 50 in some embodiments. The processor 125 or other computing platform can execute flow 700 to provide an image in response to sensor parameters and radar data. At an operation 702, radar beams are provided by the radar antenna 120. At an operation 704, radar returns are received by the radar antenna 120. At an operation 706, radar data and sensor data associated with the radar returns are processed to provide the intensity and location of the radar returns. In some embodiments, the radar system 30 provides data representing a 120 degree field of view in accordance with a weather radar sweep. The width and direction of the sweep can be varied in certain embodiments. The sweep is directed toward the surface of the ocean so that returns are obtained which allow a radar image to be created from the surrounding maritime environment. Various types of sweeps, scans and timings of sweeps and scans can be utilized without departing from the scope of the invention.

The locations of the radar returns are determined using the radar data and parameters from the onboard sensors 105 in some embodiments. The location is determined using beam sharpening techniques in some embodiments. At an operation 710, radar image data is generated from the radar returns with their associated intensity and location data. In some embodiments, the radar image data is generated based on azimuth and range from the position of the helicopter. In some embodiments, the radar image data is generated based on a coordinate transformation or projection method. At an operation 712, reference data is provided from a reference database. At an operation 714, reference image data is generated from the reference data. The reference image data is generated based on a transformation using a viewpoint and projection method. The location of the viewpoint is related to the absolute coordinates of the reference database in some embodiments. In some embodiments the viewpoint location and projection method for operation 710 and operation 714 are the same, even though the viewpoint location can be referenced relative or absolute for operations 710 and 714. At an operation 716, the radar image data from operation 710 and reference image data from operation 714 is combined to provide combined image data for display. The combined image includes a feature (e.g., the landing site symbol 506 in FIG. 4) for the landing site 28. At an operation 718 the image data is displayed as an image on a display. In some embodiments operations 712, 714 and 716 are not performed, in which case the image data from operation 710 is displayed on a display in operation 718 without combining it with the reference image data.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types.

Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A weather radar system for use in a helicopter, the weather radar system comprising:
    an antenna;
    a control circuit coupled with the antenna and configured to:
        provide radar beams via the antenna toward external surroundings;
        receive radar returns;
    process data associated with the radar returns to determine an intensity associated with the radar returns and a location associated with the radar returns, the location being determined with high resolution angle and high resolution range using at least the following parameters: a beam sharpening angle, and an antenna scan angle; and
    process the radar returns with the associated intensity and location to provide radar image data.

2. The weather radar system of claim 1, wherein the control circuit is further configured to:
    determine the location associated with each of the radar returns using an antenna attitude, the beam sharpening angle, and a range.

3. The weather radar system of claim 2, wherein motion of the antenna is taken into account in determining the location associated with the radar returns.

4. The weather radar system of claim 3, wherein an attitude of the antenna is determined using an attitude sensor associated with the antenna.

5. The weather radar system of claim 3, wherein the beam sharpening angle is a radar sensed direction of an individual radar return with respect to an attitude of the antenna.

6. The weather radar system of claim 5, wherein the beam sharpening angle is generated using a monopulse technique, a sub-aperture radar technique, deconvolution of a beam point spread function, or any combination thereof.

7. The weather radar system of claim 3, wherein the control circuit is further configured to provide combined data, the combined data being comprised of landing site data and the radar image data.

8. The weather radar system of claim 1, wherein the control circuit is further configured to: determine the location associated with each of the radar returns using ultra-wideband pulsing, stepped-frequency compression, or pulse compression.

9. A method of providing radar image data for provision of a radar image during offshore operations to avoid obstacles, the method comprising:
    determining an antenna attitude of an antenna;
    receiving radar returns from at least one of an X-hand and a C-band weather radar system;
    determining a location of each of the radar returns using the antenna attitude, a beam sharpening angle, and a range;
    determining an intensity associated with each of the radar returns; and
    providing radar image data, the radar image data being derived from the intensity and location associated with the radar returns.

10. The method of claim 9, wherein motion of the antenna is taken into account in determining the location associated with each of the radar returns.

11. The method of claim 9, wherein the beam sharpening angle is determined using at least one of: a monopulse technique, a sub-aperture or split aperture technique, deconvolution of a beam point spread function, or a combination thereof.

12. The method of claim 9, wherein the radar image data is provided to identify a landing site.

13. The method of claim 12, wherein the radar image data is combined with landing site image data.

14. The method of claim 13, further comprising:
    comparing the radar image data to the landing site image data to confirm colocation of a radar sensed landing site and the landing site associated with the landing site image data.

15. A system for a helicopter, comprising:
    a weather radar system configured to:
        process the radar returns to determine an intensity and location of the radar returns to provide image data representative of an offshore environment associated with radar returns received by the weather radar system during offshore operations, the radar returns being in an X-band or a C-band, wherein the location is determined using at least an antenna position and a beam sharpening angle; and
    a display in communication with the weather radar system and configured to display an image associated with the image data.

16. The system of claim 15, wherein the image is a combined image including a landing site symbol and the image data derived from intensities and locations associated with the radar returns.

17. The system of claim 16, wherein the weather radar system is configured to provide radar beams having pulses using ultra-wideband pulsing, stepped-frequency compression, or pulse compression.

18. The system of claim 15, wherein the radar returns are processed using the beam sharpening angle, the beam sharpening angle being a radar sensed direction of an individual radar return with respect to a boresight of an antenna.

19. The system of claim 18, wherein the beam sharpening angle is generated using a monopulse technique, a sub-aperture radar technique, deconvolution of a beam point spread function, or any combination thereof.

20. The system of claim 15, wherein the image data is compared to landing site reference data to check integrity of helicopter location and orientation or integrity of the landing site reference data.

* * * * *